(12) United States Patent
Zauderer

(10) Patent No.: US 6,453,830 B1
(45) Date of Patent: Sep. 24, 2002

(54) REDUCTION OF NITROGEN OXIDES BY STAGED COMBUSTION IN COMBUSTORS, FURNACES AND BOILERS

(75) Inventor: Bert Zauderer, 75 N. Highland Ave., Merion Station, PA (US) 19066

(73) Assignee: Bert Zauderer, Merion Station, PA (US)

( * ) Notice: Subject to any disclaimer, the term of this patent is extended or adjusted under 35 U.S.C. 154(b) by 0 days.

(21) Appl. No.: 09/794,613

(22) Filed: Feb. 28, 2001

Related U.S. Application Data

(60) Provisional application No. 60/185,753, filed on Feb. 29, 2000, and provisional application No. 60/236,355, filed on Sep. 29, 2000.

(51) Int. Cl.⁷ .............................. F23B 5/00; F23G 7/06; F73T 15/00
(52) U.S. Cl. ...................... 110/345; 110/210; 110/342; 110/348
(58) Field of Search ................................ 110/190, 210, 110/204, 219, 232, 101 R, 110, 342, 345, 347, 348; 239/419, 427, 427.3

(56) References Cited

U.S. PATENT DOCUMENTS

| | | | |
|---|---|---|---|
| 4,995,733 A | * 2/1991 | Thomas et al. | 374/140 |
| 5,161,471 A | * 11/1992 | Piekos | 110/165 R |
| 5,411,394 A | * 5/1995 | Beer et al. | 431/9 |
| 5,756,059 A | * 5/1998 | Zamansky et al. | 423/239.1 |
| 5,890,442 A | * 4/1999 | Holmes et al. | 110/345 |
| 5,908,003 A | * 6/1999 | Hura et al. | 110/345 |
| 5,937,772 A | * 8/1999 | Khinkis et al. | 110/345 |
| 5,967,061 A | * 10/1999 | Ashworth et al. | 110/203 |
| 6,152,054 A | * 11/2000 | Ashworth et al. | 110/345 |
| 6,213,032 B1 | * 4/2001 | Breen et al. | 110/345 |

* cited by examiner

Primary Examiner—Ira S. Lazarus
Assistant Examiner—K. B. Rinehart
(74) Attorney, Agent, or Firm—McGuireWoods LLP

(57) ABSTRACT

Nitrogen oxides, $NO_x$, resulting from the excess air combustion of solid fuels in a combustor or burner in a furnace are reduced. By introducing sufficient additional fuel to the combustion gases in the furnace downstream of the primary combustion zone, a fuel rich gas zone is created in a temperature range that favors the conversion of $NO_x$ to nitrogen, $N_2$. Further downstream sufficient additional air is added to complete the combustion of any unburned fuel. Alternatively, the fuel rich gas zone can be confined to a central region of the furnace. In that case, final combustion takes place when the fuel rich gas mixes with the untreated gas further downstream in the furnace. The preferred embodiment of this invention is to introduce the additional fuel in said downstream combustion zone as solid particles dispersed in aqueous droplets of varying size that vaporize throughout the furnace gas zone being treated. The dispersed solid fuel particles burn as they evolve from the droplets. Special injectors atomize the aqueous droplets into the combustion gas and disperse them throughout the optimum NOx reduction temperature zone. Alternatively, the fuel rich combustion zone can be produced with injection of liquid fuel droplets. A third alternative is to use pyrolysis gas emitted from the partial gasification of a solid fuel. A fourth alternative is to inject pulverized coal particles or shredded biomass particles into the optimum $NO_x$ reduction zone. The present staged combustion method using these fuels and fuel injection methods can be combined with other NOx reduction processes to yield large overall $NO_x$ emission reductions.

37 Claims, 4 Drawing Sheets

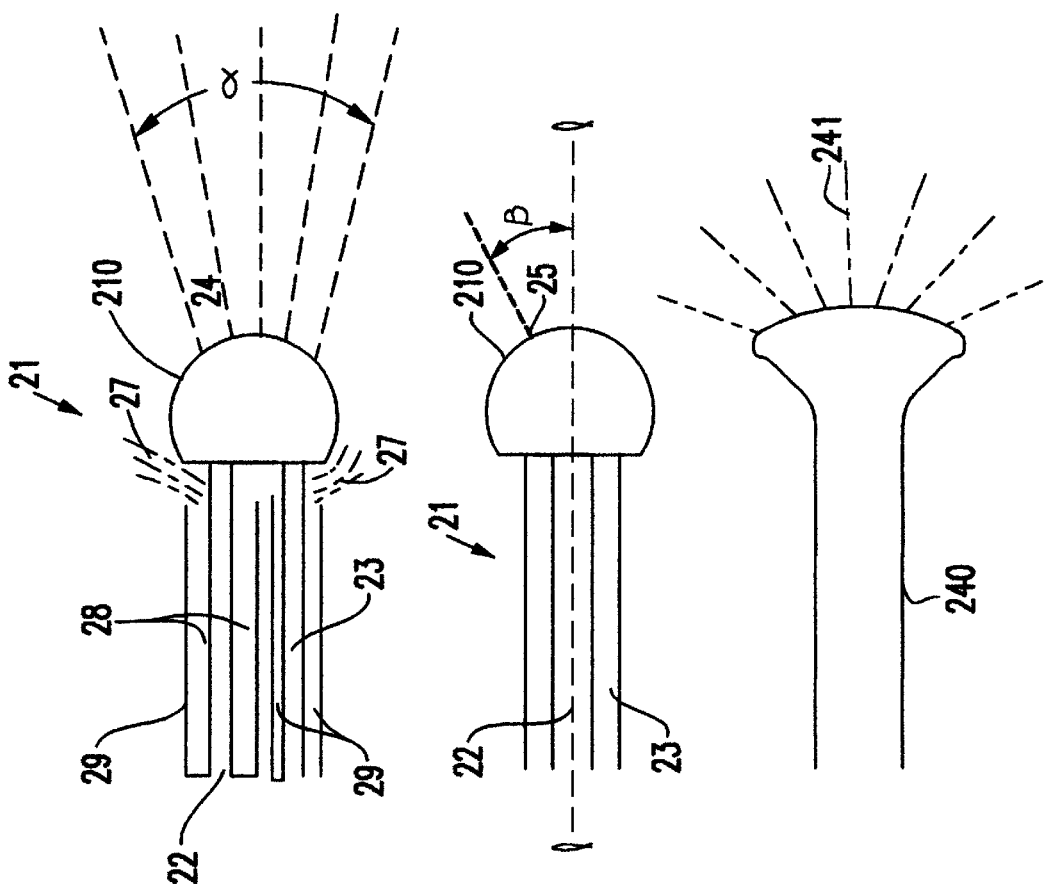

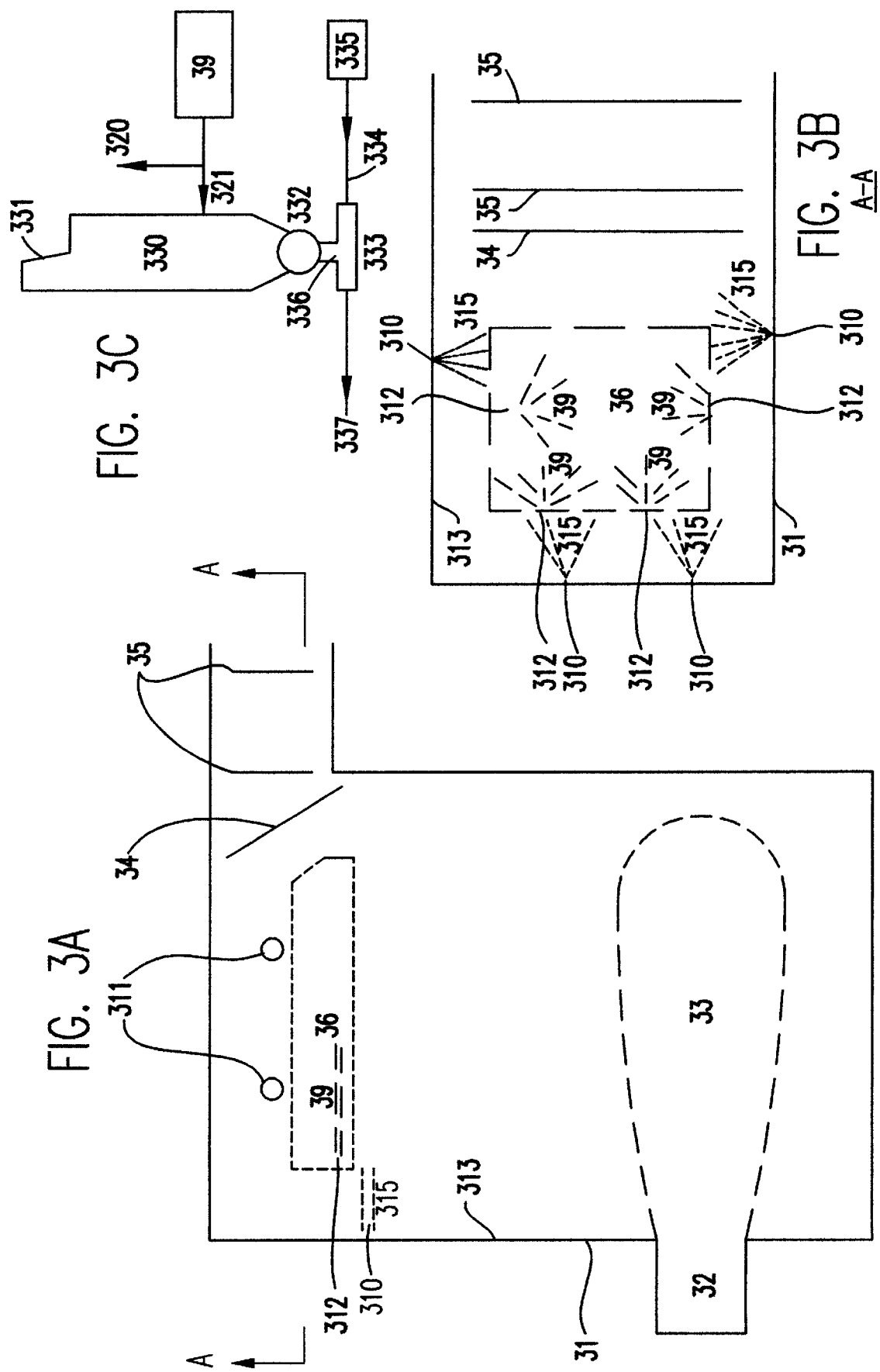

REDUCTION OF NITROGEN OXIDES BY STAGED COMBUSTION IN COMBUSTORS, FURNACES AND BOILERS

This application claims benfit of No. 60/185,753 filed Feb. 29, 2000 and claims benfit of No. 60/236,355 filed Sep. 29, 2000.

BACKGROUND OF THE INVENTION

1. Field of the Invention

The present invention discloses a method for the reduction of the concentration of nitrogen oxides, $NO_x$, in the products of combustion of a solid fossil fuel. The method comprises of creating a fuel rich combustion zone downstream of a primary excess air combustion zone in a combustor or furnace by introducing additional fuel into the downstream zone. The preferred embodiment of this invention is to inject into the downstream zone, aqueous liquid droplets containing dispersed solid fuel particles. Dispersion of the solid fuel particles is maintained by continuous mixing of the liquid and, if necessary, by the addition of a surfactant in the liquid-solid mixing vessel. Injection takes place in the furnace at a temperature range of 2000° F. to 2500° F. downstream of the main combustion zone where about 90% of the total fuel is burned under excess air conditions. The additional fuel injected in said zone results in slightly fuel rich temperature conditions, which converts the $NO_x$ to molecular nitrogen. For economic reasons, it is preferred to limit the additional fuel to 10% of the total fuel heat input to the furnace or boiler. However, the process has been found to be effective even with more than 30% of the total heat input injected in the downstream zone. Further downstream, sufficient additional air is introduced into the furnace to oxidize all unburned combustion gases and remaining fuel particles. Alternatively, the fuel rich $NO_x$ reduction zone can be limited to a central region of the furnace. The combustion gases containing excess air that surrounds this fuel rich zone will mix further downstream with the fuel rich gas and complete the combustion process. Specially designed atomized water droplet injectors are utilized to disperse and vaporize the droplets that contain the solid fuel particles throughout the gas temperature zone that yields optimum $NO_x$ reduction.

Alternatively, the fuel rich combustion zone can be produced by dispersion of liquid fuel droplets of varying size throughout the gas temperature zone at which $NO_x$ reduction is effective.

A third alternative method to produce the fuel rich combustion zone is to utilize pyrolysis gas, derived from coal or biomass produced in a separate vessel.

A fourth alternative method to introduce the additional fuel is to use pulverized coal particles or shredded biomass particles. The selection of the specific fuel and means for introducing this fuel is determined by fuel availability and economics and by combustor and boiler design considerations. The staged combustion method of this invention using these fuels and fuel injection methods can be combined with other $NO_x$ reduction processes to yield large overall $NO_x$ emission reductions.

2. Description of Prior Art

The combustion of fossil fuels under excess air conditions leads to the formation of $NO_x$, a pollutant that leads to smog and acid rain over wide areas far removed from the combustion source, and it is especially a problem in urban environments. There are two sources of $NO_x$, one is primarily formed during the combustion of solid fossil fuels, especially coal. The fuel bound nitrogen whose concentration is generally in the range of 1% by weight in the coal is the primary source of $NO_x$ in coal combustion. The three primary $NO_x$ precursors released in the combustion of fuel bound nitrogen are hydrogen cyanide, HCN, ammonia, $NH_3$, and nitrogen oxide, NO. In fuel rich combustion, these three species are converted to nitrogen. Many researchers have measured the rate of destruction of these species under fuel rich conditions, (e.g. J. W. Glass and J. O. L. Wendt, "Mechanisms Governing the Destruction of Nitrogenous Species During Fuel Rich Combustion of Pulverized Coal", in *Proceedings* $19^{th}$ *Symposium* (*International*) *on Combustion*, [The Combustion Institute, Pittsburgh, Pa. 1982] p.1243).

These rates can be used to estimate the time required to reduce these three species by a specific amount, such as a factor of 10. It was found that as the stoichiometric ratio approaches unity, i.e. as it proceeds from very fuel rich to leaner conditions, the concentration of NO predominates and the other two species are sharply reduced, (see for example, Y. H. Song, et.al., "Conversion of Fixed Nitrogen in Rich Combustion", in *Proceedings* $19^{th}$ *Symposium* (*International*) *on Combustion,* [The Combustion Institute, Pittsburgh, Pa. 1982] p.53). Therefore, a conventional fuel lean combustor will produce almost completely NO species.

Calculations were performed for the time needed for a factor of 10 reduction of NO in a Western U.S. coal, using Glass' reaction rates, for two fuel rich stoichiometric ratios of 0.5 and 0.7, i.e. 50% and 30% oxygen deficiency, respectively. Initial concentrations of NO at these stoichiometric ratios were taken from D. P. Rees, et.al., "NO Formation in a Laboratory Pulverized Coal", in *Proceedings* $19^{th}$ *Symposium* (*International*) *on Combustion,* [The Combustion Institute, Pittsburgh, Pa. 1982] p. 1305). It was found that temperature was by far the primary rate-governing factor, a factor of ten reduction required several seconds, while at 2500° F., it required about 0.1 seconds, and at 3000° F., about 0.01 seconds, for both 50% and 30% fuel rich stoichiometry. At the highest of these temperatures, however, thermal $NO_x$ begins to form in significant quantities under excess air conditions. Additionally, combustion with oxygen in excess of the amount required for stoichiometric combustion, which is required for all fossil fuels to minimize other pollutants, such as carbon monoxide, results in the formation of thermal $NO_x$. Thermal $NO_x$ is formed from the reaction of nitrogen with oxygen in the combustion air, and its concentration rises substantially at temperatures above about 3000° F.

The combustion gas velocity in the furnace region upstream of the superheater in large boilers is in the range of 20 to 25 feet per second. Therefore to create a,fuel rich zone in combustion gases containing excess oxygen at 2000° F. would require a distance of 10's of feet in the gas flow direction to achieve the factor of ten NO reduction. It thus appears that temperatures nearer to 2500° F. are preferred to reduce the NO concentration in a thin gas slab perpendicular to the combustion gas flow direction. Based on the NO reduction calculation, it is only necessary to introduce the additional fuel at the base of a slab of gas having the proper temperature in a cross-section perpendicular to the gas flow direction. At 2500° F., only 2 to 2-½ feet in the gas flow direction are required to effect a high NO concentration reduction. While the calculation given here demonstrates the disclosed reburn approach, in actual practice a gas temperature range of 2000° F. to 2500° F. should be evaluated for optimizing the location of adding reburn fuel and the amount of reburn fuel needed for each specific boiler or furnace.

This additional fuel, or reburn fuel, produces a fuel rich zone downstream of the primary combustion zone of the furnace or boiler where the combustion gases contain an excess of oxygen. It is essential to implement the reburn process in as short a distance in the gas flow direction as possible. Furthermore, the reburn fuel should be introduced at the outer gas temperature boundary at which the NO reduction rate is optimum. This location for introducing the reburn fuel should be several feet away from the boiler walls in large boilers because the combustion gas temperature near the wall is lower and the reburn reaction rate is slower. The present invention discloses how this reburn fuel is preferably introduced into the boiler or furnace.

Coal is the primary fuel for utility boilers, and to efficiently burn it requires combustion at 3000° F. or higher. Consequently, both fuel bound and thermal $NO_x$ form in high concentration, especially in large coal fired boilers used in electric utility power plants.

Several currently practiced technologies are used to control the emissions of $NO_x$ from fossil, and especially from coal, fired boilers. Among these control technologies are: Staged combustion in which initial fuel rich-combustion in or very close to the fuel injection zone is followed by excess air combustion immediately downstream of the initial combustion zone. There are a number of different staged combustion processes and system designs, depending on the boiler design. It has been observed that combustion under fuel-rich conditions converts the fuel bound NOx precursors to nitrogen, with the maximum reduction occurring at a stoichiometric ratio of 0.7, i.e. 70% of the combustion air needed for complete oxidation of all the fuel that is provided (see for example, J. W. Glass and J. O. L. Wendt, "Mechanism Governing the Destruction of Nitrogenous Species During Fuel Rich Combustion of Pulverized Coal", in *Proceedings of the 19<sup>th</sup> Symposium (International) on Combustion,* {The Combustion Institute, Pittsburgh, Pa. 1982}, p.1243), and ( Y. H. Song, et. al. "Conversion of fixed Nitrogen in Rich Combustion", in *Proceedings of the 18<sup>th</sup> Symposium (International) on Combustion,* {The Combustion Institute, Pittsburgh. Pa. 1982}, p.53 ).

In the most widely used staged combustion method, the main burners in large industrial or utility boilers are fitted with "low $NO_x$ burners" that create a fuel rich zone at the lower end of the boiler. Final combustion air is introduced at one or more locations immediately downstream of the primary combustion zone of the boiler to complete combustion. One of the significant deficiencies with this process is that higher levels of unburned carbon are produced, which reduces the combustion efficiency and can make the fly ash unsuitable for recycling. The other deficiency is that chemical compounds can form in the fuel rich zone that corrode boiler metal tubes.

Another staged combustion process is applicable to slagging, cyclone combustors using pulverized coal with a fineness in the range of 70% passing through a 200 mesh (70 microns). Zauderer has measured $NO_x$ reductions ("Demonstration of an Advanced Cyclone Coal Combustor, with Internal Sulfur, Nitrogen, and Ash Control for the Conversion of a 23 MMBtu/hr Oil Fired Boiler to Pulverized Coal" Coal Tech Corp., August 1991, NTIS Documents DE92002587 and DE92002588, also "Status of Coal Tech's Air-Cooled Slagging Combustor" in *Second Annual Clean Coal Technology Conference,* September 1993, NTIS Document Conf-9309152) to the 0.3 to 0.4 lb/MMtu range (reported as $NO_2$) in the boiler outlet stack under fuel rich conditions inside the combustor, where initial $NO_x$ concentrations were in the range of 0.8 to 1 lb/MMBtu under fuel lean conditions in the combustor. Final combustion air was introduced to the combustion gas at the combustor exit. Here again unburned carbon increased as the combustor stoichiometry decreased from 1 to 0.8, resulting in high levels of unburned carbon in the fly ash.

In summary, this staged combustion method of NOx control can achieve between 50% and 70% NOx reduction depending on the combustion system. However, the combustion efficiency loss and the carbon in the fly ash are two significant defects. Nevertheless, this method may be used in combination with other NOx control process to achieve substantial overall $NO_x$ reductions, if the carbon in the fly ash can be maintained below about 5%.

Another $NO_x$ control process is selective catalytic reduction, SCR, in which the relatively cold combustion gas effluent of several 100° F. is passed over a catalyst coated bed in the presence of ammonia. The process can achieve over 90% NOx reduction and meet the most stringent $NO_x$ reduction standards. However, its capital cost is very high and the catalyst must be replaced at regular intervals, which results in a high maintenance cost.

Another process, generally called selective non-catalytic reduction, SNCR, involves the injection of various chemical compounds, primarily urea or ammonia, with or without various chemical additives, into the combustion gases in the boiler furnace at temperatures of about 1800° F. to 2000° F. where the $NO_x$ to $N_2$ reaction is favored. This method can achieve in excess of 50% NOx reduction. However, it is essential to inject all the reagent into the proper gas temperature zone in order to minimize un-reacted $NH_3$ carryover to the low temperature heat exchanger region where the $NH_3$ reacts with sulfur gas to form liquid deposits on metal surfaces. Also, $NH_3$ concentrations in the fly ash, as determined by ammonia odor, render the ash unsuitable for recycling. Finally, excess $NH_3$ emissions in the stack gas plume can form a visible undesirable haze. Consequently, this method generally limits $NH_3$ emissions downstream of the $NO_x$ reaction zone to 5 parts per million or less.

In order to assure injection of the reagent throughout the appropriate combustion gas temperature zone, Zauderer invented (U.S. Pat. No. 6,048,510) a droplet injector method in which droplets of varying size that contain the dissolved reagent, urea or ammonia, vaporize throughout the proper gas temperature zone of 1800° F. to 2000° F. This SNCR method has reduced $NO_x$ emission by about 50%. Zauderer combined it with the staged combustion method in a cyclone combustor to yield NOx emissions at the stack below 0.1 lb/MMBtu from untreated levels of 0.8 to 1.0 lb/MMBtu.

In the prior art, staged combustion, in which fuel lean combustion is followed by fuel rich combustion and final fuel lean combustion, has been called "reburn" because the combustion gas is "re-burned" downstream of the primary combustion zone. Two fuels have been mostly used for reburn, natural gas or pulverized coal.

In one case, natural gas is injected through one or more jets into the upper regions of a boiler's furnace in quantities ranging from 5% to 20% of the total boiler heat input. The balance was pulverized coal injected in the primary combustion zone. For example, in reburn tests on a 158 MW electric output boiler, ("Evaluation of Gas Reburning and Low NOx Burners on a Wall Fired Boiler", U.S. Department of Energy's (DOE) Clean Coal Project, in *Clean Coal Technology-Propram Update* 1998, Report No. DOE-FE-0387, March 1999, pages 5–54 to 5–57) a combined total of 65% $NO_x$ reduction from an initial 0.73 lb/MMBtu was measured. Of this total, 37% was due to low $NO_x$ burners in the primary coal combustion zone, and the additional 43% reduction was due to reburn, using natural gas at 18% of the total heat input. In a second group of tests, the total reduction was 64% from an initial 0.73 lb/MMBtu of which 44% was due to low $NO_x$ burners and the additional 36% was due to natural gas reburn equal to 12.5% of the total heat input. This gas reburn method has two major drawbacks. One is the high cost of installing a pipeline to bring the gas to a coal fired power plant. Two is the substantially higher cost of natural gas compared to the coal it replaces. The economics of this process was marginal even when these tests were implemented at a time when the price of natural gas was in its historical range of $1 to $2 per million Btu range. At recent prices, approaching as high as $10 per million Btu, this process is uneconomical. Furthermore, the $NO_x$ reductions due to gas reburn is less than 50%, necessitating a third additional process to bring this boiler in compliance with the new EPA standard of 0.15 lb/MMBtu. This requires a total $NO_x$ reduction of 88% for this 158 MWe power plant.

Another DOE sponsored reburn project ("Demonstration of Coal Reburning for Cyclone Boiler NOx Control", U.S. Department of Energy's (DOE) Clean Coal Project, in *Clean Coal Technology-Program Update* 1998, Report No. DOE-FE-0387, March 1999, pages 5–46 to 5–49) involved the use of pulverized coal as the reburn fuel for a 100 MWe cyclone fired boiler that uses crushed coarse coal as the primary fuel. Cyclone boilers have high NOx levels because the use of crushed coal requires combustion at excess air to burn the coarse coal particles. 50% to 55% NOx reductions to as low as 0.30 lb/MMBtu were measured with 29% to 35% of the fuel input due to the pulverized reburn coal. The drawback of this reburn process is its high capital cost ($43 to $66/kW) due to the need to add coal pulverizers to prepare the reburn coal. Pulverizers are not required for preparing the crushed coal used in cyclone fired boilers. As a result the cost of NOx reduction is high, ranging from $408 to $1065/ton removed, levelized over 10 years, for a 605 MWe and a 110 MW power plant, respectively. Here again an additional 50% reduction is needed to meet the new EPA standard of 0.15 lb/MMBtu. Furthermore, the initial $NO_x$ level in this 100 MWe boiler was relatively low compared to most crushed coal cyclone boiler. In other words, higher reductions would be needed in most cyclone boilers.

There are variations of this reburn process, such as using extremely fine (passing though a 325 mesh or less) pulverized coal for reburn. Also biomass has been used as a reburn fuel by other investigators according to a Department of Energy solicitation announcement (Solicitation: DE-PS26-00NT4077) with unreported results. However, the above two examples are representative of current reburn $NO_x$ control technology.

These prior art reburn processes also have a fundamental deficiency, namely the need to assure that the reaction to convert $NO_x$ to $N_2$ occurs throughout the combustion gas temperature zone at which "reburn" reaction is effective. The location where reburning would be effective in a large boiler is high up in the radiant furnace section, where the combustion gas temperature is low enough, typically about 2000° F., or somewhat higher, so that the added "reburn" fuel does not result in such a high temperature that thermal $NO_x$ is formed in the final combustion zone. Even in a relatively small utility boiler, such as a 50 MW unit, the furnace cross-section perpendicular to the gas flow direction is well over one hundred square feet. The problem with injecting natural gas jets or pneumatically injecting dry pulverized coal jets into this region is that it is impossible to uniformly cover the entire furnace cross-section with a uniform temperature "reburn" combustion zone when using a reasonable small number of fuel injector jets. Even if the boiler water-wall were to be penetrated with a large number of openings to allow the installation of a large number of gas or coal injection jets, it would still be difficult to project the flame front to the center of the furnace. Therefore, in view of the high cost of natural gas, gas fuel reburn should only be used if the fuel source is very low in cost.

SUMMARY OF THE INVENTION

The present invention discloses a method for the reduction of the concentration of nitrogen oxides (NOx) in the products of combustion of a fossil fuel. The method consists of a staged combustion process in which a small quantity of additional fuel is injected into a furnace or boiler, downstream of the primary, excess air combustion zone, to render said injection zone slightly fuel rich and convert the nitrogen oxides into nitrogen gas. Additional air is added further downstream of said injection zone to complete final combustion under excess air conditions. Said injection zone is at a location in the furnace or boiler where the local gas temperature is low enough to prevent the formation of thermal nitrogen oxides from excessively high gas temperatures in the excess air, final combustion zone. Specifically, to assure uniform combustion from the added fuel throughout the reburn combustion zone, this invention is preferably practiced by injecting the added fuel as air or steam atomized liquid droplets of varying size, consisting of either oil-coal or coal-water slurry containing pulverized coal particles dispersed in the oil or water, which said solid particles being smaller than the droplets. The droplet injectors that are inserted in the furnace of a boiler at the outer edge of a temperature zone that is preferably in the range of about 2000° F. to about 2500° F., which is low enough to prevent increased formation of thermal $NO_x$ in the final combustion zone, yet high enough to assure complete combustion of any gas molecules or residual solid particles in a second zone where additional air is injected in order to complete combustion. In the preferred embodiment of the present invention, combustion of the solid fossil fuel particles takes place in the primary combustion zone under excess air conditions in order to minimize or totally eliminate any unburned carbon. Additional fuel, typically 5% to 20% of the total fuel input to the furnace or boiler, is introduced downstream of this primary combustion zone to result in a slightly fuel rich zone. This converts some of the $NO_x$ and its precursors into molecular nitrogen. Final combustion air is introduced into the furnace or boiler downstream of this slightly fuel rich zone to complete combustion under excess air conditions.

Alternatively, depending on the dimensions of the fuel rich combustion zone and the amount of fuel injected into this zone, there may be sufficient combustion gas regions containing excess air in the furnace, or boiler, outside the reburn zone to allow mixing with the fuel rich gases and complete combustion downstream of the fuel rich zone. In either case, the droplet size range are determined by the dimensions of the boiler being treated, while the dispersed solid fuel particle sizes are determined by the particle size needed to achieve rapid combustion after release from the vaporized droplets. Alternatively, fuel oil can be used for reburn in which case the droplets size range is selected to assure combustion throughout the gas zone being treated for $NO_x$ reduction, and lower cost hydraulic atomization is preferred over air or steam atomization. A further critical element of this invention is that in large furnaces or boilers, the droplets are injected in a flat fan pattern, perpendicular to the gas flow direction, which minimizes the number of injectors required. The present invention corrects this deficiency of non-uniform coverage of the NOx reduction reburn zone by preferably utilizing a droplet injector method similar to that disclosed in Zauderer's invention of a Selective Non-Catalytic NOx Reduction, SNCR, process (U.S. Pat. No. 6,048,510, Apr. 11, 2000). In the present invention, droplets of varying size are used to introduce either a liquid fuel, such as oil, or solid fuel particles, such as pulverized coal or fine biomass particles, dispersed in liquid droplets of fuel, such as oil or water droplets, into the "reburn" combustion zone downstream from the primary combustion zone. By using a droplet injector nozzle to create a droplet spray of varying size, the droplets will vaporize throughout the zone at which the staged reburn combustion is effective. This assures that the $NO_x$ to $N_2$ reaction occurs throughout the combustion gas zone at which it is effective. A further benefit is that the number of injectors needed to implement this process is minimized to the point where existing access ports in a furnace or boiler can be used. This eliminates the need for adding costly new openings in the boiler wall. Therefore, the present invention allows reduction of $NO_x$ with the reburn method at very low capital and operating costs, when using pulverized coal for reburn in a pulverized coal fired plant, and at low capital cost, but with higher operating cost, when using oil for reburn.

For cyclone boilers that are fired with crushed coal, whose large particles are unsuitable for dispersion in oil or water, and which do not have on site pulverizers, this invention is practiced by partial gasification or pyrolysis of the crushed coal in a separate vessel, and injecting the gas through suitable air blown jets into said reburn zone. The residual char from gasification or pyrolysis is injected into the boiler's primary cyclone combustors. Pyrolysis can also be used with shredded biomass fuel in any furnace or boiler, with the residual char injected in the primary combustion zone. Alternatively, some pulverized coal can be removed from the outlet of the pulverizers that feed a conventional pulverized coal fired boiler and used as the reburn fuel for $NO_x$ control. Similarly, shredded biomass can be injected pneumatically with air transport into said reburn zone. The specific approach selected will depend on the fuel type, fuel preparation, combustion type, and economics for the specific furnace or boiler being treated for $NO_x$ reduction. In most cases, the liquid droplet injector approach will be the preferred method for treating $NO_x$ reduction by the staged, reburn process. The one exception where pneumatic injection of the fuel is preferred would with biomass as the reburn fuel. Despite the deficiencies of gas fuel injection, there are situations where gas fuel or dry solid fuel are advantageous for staged reburn combustion for NOx control, namely, when the cost of the fuel is low or when secondary benefits outweigh the lesser efficiency of the gas or dry fuel for reburn. These cases, which are also part of the present invention, involve the use of dry, shredded biomass fuel that is injected pneumatically into the reburn combustion zone, or the use of pyrolysis gas prepared at the boiler site and derived from crushed coal or shredded biomass. The pyrolysis method is preferred for power plants operating with crushed coal fired, cyclone combustors, where the residual char from the pyrolysis process can be fired in the cyclone combustors. The advantage of using biomass, a renewable fuel, for reburn is that it reduces the overall emission of carbon dioxide, a greenhouse gas, which offers the user an additional $NO_x$ emission credit from the Environmental Protection Agency (EPA). The advantage of using pyrolysis gas from coal is that it eliminates the need for costly pulverizers in plants using crushed coal, cyclone combustors.

BRIEF DESCRIPTION OF THE DRAWINGS

To clarify certain aspects of the present invention, the following drawings are appended to the detailed description of the invention:

FIGS. 2A–E are schematic drawings of liquid droplet spray atomizers producing round and flat spray patterns. FIG. 2A shows a side view arrangement of parallel air and water feed pipes to the spray injector with external coaxial pipes containing cooling water for both the air and water feed pipes. FIG. 2B shows the outlet port for the round spray pattern from a single outlet port, FIG. 2C shows the outlet ports for the round spray pattern from multiple outlet ports. FIG. 2D shows the outlet port for a flat spray pattern. FIG. 2E is a side view of the atomizer showing the outlet spray pattern corresponding to that of FIG. 2C. FIG. 2F shows an end view and FIG. 2G shows a side view of a nozzle outlet suitable for injection of a solid pulverized coal or solid shredded biomass fuel or a gaseous fuel into the staged reburn combustion zone.

FIG. 3A shows a side view of the furnace and initial convective tube section of a large industrial or utility boiler, and FIG. 3B shows the cross-sectional view of the furnace section and the placement of the aqueous droplet injectors. FIG. 3C shows an arrangement for removing pulverized coal from the main coal pulverizers, storing this coal, and subsequently pneumatically conveying it either to the staged reburn combustion zone in the boiler of FIG. 3A, or delivering it to the coal slurry preparation system shown in FIG. 4.

DISCLOSURE OF INVENTION

Figure 1B:
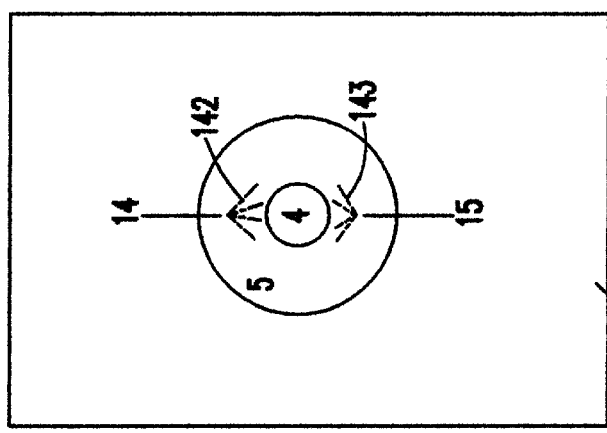
FIGS. 1A and 1B are side and rear end view schematic drawings, respectively, of a 17,500 pound per hour package boiler to which a 20 million Btu per hour coal fired cyclone combustor is attached. The drawing shows the placement of the staged reburn combustion fuel injectors, consisting of either an oil droplet injector, or a coal-water slurry droplet injector, or a coal-oil slurry droplet injector, or a pneumatic solid fuel particle injector, or a pyrolysis gas or gasified solid fuel injector. Also, shown is a pyrolizer or gasifier vessel, which produces the gaseous fuel for staged, reburn combustion, with the residual char from said vessel being injected into the cyclone combustor.

The present invention describes a method for optimally introducing a small amount, typically 5% to 20% of additional fuel, consisting of either oil, or a coal-oil slurry, or a coal-water slurry, or pulverized coal, or shredded biomass, or gas derived from pyrolysis or partial gasification of crushed coal or coarse biomass, into the combustion zone downstream of the primary excess air combustion zone of a fossil fuel fired boiler to produce a fuel rich combustion zone. Said fuel rich zone reduces the concentration of nitrogen oxides in the combustion gas, which then mixes with additional air downstream of said fuel rich zone to complete combustion. The liquid droplet injectors are inserted into the furnace away from the wall at the outer edge of the gas temperature zone that favors the reduction of nitrogen oxides to nitrogen. Cooling of the injectors and its air and liquid feed pipes in the hot gas zone is accomplished by water-cooled pipes that enclose each of said pipes. This invention addresses the very critical issue of assuring that the injected droplets containing the fuel will be widely dispersed throughout the gas temperature zone at which the nitrogen oxide reduction reaction is effective. Since it is not feasible to reduce all the $NO_x$ to $N_2$ in the gas stream with this reburn combustion process alone, this process may be practiced in combination with other $NO_x$ reduction processes, such as staged combustion in the primary combustion zone using low $NO_x$ burners or entrained pulverized cyclone combustors in boilers originally designed for dry ash fuels. Another $NO_x$ reduction process, such as the SNCR process in which urea or ammonia is injected at or immediately downstream of the reburn zone, using, for example, Zauderer's SNCR process (U.S. Pat. No 6,048,510, Apr. 11, 2000, which is herein incorporated by reference), can be added to both primary staged combustion and reburn staged combustion $NO_x$ reduction processes to further reduce the $NO_x$ emission level at the stack to below 0.15 lb/MMBtu. Alternatively, this invention may also be practiced in combination with SCR processes to eliminate $NO_x$.

The $NO_x$ reduction process of this invention may also be combined with a $SO_2$ reduction process involving the injection, either separately or pre-mixed with the reburn fuel, of a $SO_2$ reducing agent, such as calcium hydrate, into the gas stream at or near the reburn combustion zone. These other $SO_2$ reduction processes are described in the following documents: 1) Zauderer, B., U.S. Pat. No. 4,624,191 and 4,765,258, 2) Zauderer, B. "A Method for the Reduction of Sulfur Dioxide Concentrations in the Furnace Region of Boilers", Invention Notebook, Dec. 2, 1999, and 3) Zauderer, B., "Method for Combined Reduction of Nitrogen Oxide and Sulfur Dioxide Concentrations in the Furnace Region of Boilers", (U.S. Provisional Application Serial No. 60/236,355), each of which are herein incorporated by reference.

With regard to the simultaneous use of these injectors for $NO_x$ and $SO_2$ reduction, it is noted that both the presently disclosed $NO_x$ reburn reduction process and the $SO_2$ reduction reaction with calcined lime are effective in a partially overlapping gas temperature range of about 2000° F. to 2200° F. As a result by judicious preparation, combination, and introduction of lime to the coal water-slurry it is possible to implement the combined $SO_2$ and $NO_x$ reduction using the same injectors inserted into the boiler gas stream. It is also possible to add urea to the slurry mixture in order to increase the reduction reaction of $NO_x$. The combination of these fuels and reagents for $NO_x$ and $SO_2$ will best be determined by testing, as the reactions are sensitive to the temperatures in the furnaces injection zone. The optimum combination will be determined by the conditions that minimize total cost and maximize $NO_x$ and $SO_2$ reductions.

While this invention can be combined with the SNCR process and the SO2 reduction process using the same droplet injector, a focus of this invention is on the staged reburn reaction for $NO_x$ control. The means of adding these other reactions to the reburn reaction can be deduced by reference to the other inventions cited above.

In practicing the present reburn method with oil or coal-water or oil-coal slurry droplet injectors, said injectors are inserted into the combustion gas in the boiler with the injector tip placed at the outer edge of the temperature range where reburn is effective. The gas temperature decreases substantially in the first several feet near the furnace wall. Consequently, the reaction rate may be too slow to efficiently burn the solid coal or biomass particles. Therefore, the injectors are inserted several feet into the furnace or boiler to the outer edge of the gas zone where the temperature is high enough to completely burn the coal particles. To assure complete coverage of the reburn zone, a wide droplet size distribution is used in which the smallest droplets vaporize at the injectors and the largest droplets complete their vaporization in the center of the plane of injection in the furnace or ooiler. This is accomplished by injecting the droplets into a gas temperature zone in the furnace section of the boiler that is between about 2000° F. and 2500° F. This temperature is selected so as to prevent increasing the combustion gas temperature by the reburn fuel to a level at which thermal $NO_x$ formation would occur when the final combustion air is added downstream of the reburn zone. Thermal $NO_x$ levels become significant at gas temperatures above 3000° F. With the uniform distribution of reburn fuel achievable with the present droplet injectors, the gas temperature with even 20% added fuel in the reburn zone should be well below the 3000° F. temperature. However, with lesser uniformity resulting from gas fuel or shredded biomass reburn fuel, such as is used on some prior art cited above, pockets of higher localized temperature may form, which would result in less $NO_x$ reduction.

Atomization of the droplets to assure a wide size distribution in the range of 10 to 1000 microns is preferably implemented with compressed air. Alternatively, hydraulic atomization can be used, especially when the reburn fuel is oil. Hydraulic atomization yields substantially larger droplets, as much as a factor often, at the same pressure as with compressed air, which could be beyond the appropriate size range for dispersing the coal particles throughout the furnace. Furthermore, hydraulic atomization has a much more limited turn down ratio than compressed air atomization. Therefore, hydraulic atomization may require substantially higher pressures to yield the appropriate droplet size. This requires smaller injector outlets for the same solid fuel-liquid slurry mixture flow rates as with air atomization. The smaller the injector outlets, the more susceptible they are to blockage from the dispersed particles in the aqueous mixture. Therefore, the suitability of hydraulic atomization is less desirable from a process point of view, although it eliminates the energy drain of compressed air atomization. However, this problem does not exist with liquid fuel reburn, using oil. In that case the only limitation is the limited turn down ratio of the hydraulic atomizer. However, since the range of reburn fuel input is relatively limited, being typically between 5% and 20% of the total heat input to the furnace or boiler, the use of hydraulic atomization is warranted with liquid fuels. The injectors are much lower in cost and there is no compressed air power requirement.

For slurry reburn fuels, the solid coal particle size distribution will typically be 70% to 80%, by weight, less than about 70 micrometers (i.e. 200 mesh) in diameter, which is the same as is used in pulverized coal fired boilers. On the other hand, the water droplets containing the dispersed particles will have a size distribution that is determined by the cross-sectional area of the boiler that is perpendicular to the combustion gas flow direction at the 2000 to 2500° F. temperature that is appropriate for the $NO_x$ reburn reaction to proceed. In other words, the size of the droplet distribution will be selected so that the smallest droplets vaporize nearest to the injector while the largest droplets will complete their vaporization at the center of the cross-sectional area being treated.

As has been shown by Zauderer (U.S. Pat. No. 6,048,510) vaporization of droplets in a hot gas occurs by surface heating and boiling. Therefore, the depth of penetration of the droplets increases with increasing droplet diameter. For a boiler rated at about 100 MW electric output, droplets in a size range from several 100 microns to 1000 microns are needed for the larger droplets to penetrate to the center of the furnace. In general, droplets in the size range from 10 to 1000 microns will cover the cross-sectional area being treated in a wide range of boilers.

This surface boiling effect accomplishes the mission of introducing the coal particles that are dispersed inside the droplet at locations throughout the gas volume being treated in a manner that heats them and burns them as they reach the surface of the droplet. Therefore, those particles that are initially at the surface of the droplet heat up first, while those at the center heat up last. The size range of droplets assures that the coal particles are dispersed uniformly throughout the appropriate gas temperature zone.

On the other hand, if the coal particles were to be injected pneumatically as a dry powder entrained in a high velocity air jet, they would be carried with the air jet deep into the interior of the furnace. However, turbulent gas mixing as well as radiative heating of the particles from the furnace walls and the hot gas would more likely confine the flame zone of the reburn particles near the injection zone, with lesser combustion in the central core of the furnace. Also, due to the low bulk density of a pneumatically injected air-coal particle stream, a larger number of injectors would be needed to cover the reburn zone than with slurry injection. Therefore, it is very unlikely that there would be sufficient access ports in existing boilers to accommodate the larger number of pneumatic injectors. Even if existing access ports were solely used, the focused flame pattern from solid particle combustion would limit the uniformity in large boilers of the reburn flame across the plane of combustion gas being treated for $NO_x$ reduction to $N_2$. Adding additional openings for adding burner ports is costly, as it requires re-piping of the boiler water wall tubes. Nevertheless, as noted below, there may be circumstances where using existing access ports or adding new ports are desirable for practicing the reburn method of $NO_x$ control, and practicing such a method is included in the present invention.

Even if the primary combustion zone is outfitted with low $NO_x$ burners, which also operate under locally fuel rich conditions, additional air injected at or above these primary burners will result in excess air combustion gases. Therefore, to achieve the slightly fuel rich zone needed to reduce the $NO_x$ concentration further downstream of the primary burner zone will generally require between 5% and 20% of the total input fuel.

Due to the two deficiencies listed above, namely lesser uniformity of the reburn flame in the zone being treated for $NO_x$ reduction and the lower bulk density of pneumatically fed burners, the preferred means of practicing this invention is the thorough use of oil fuel or coal-water slurry fed through air atomized droplet injectors. This latter method will be discussed below.

However, there are several situations were either gaseous or dry solid fuels are preferred for staged reburn combustion for $NO_x$ control. One situation involves the use of biomass fuels from agricultural residue, which are shredded into elongated millimeter size particles or sawdust from wood or wood fibers that do not lend themselves to conversion to slurries. There are several major advantages of using these fuels for reburn. These fuels are annually renewable and, therefore, do not permanently add carbon dioxide, a greenhouse gas, to the atmosphere. As a result, this fuel qualifies for $NO_x$ emission credits from the U.S. EPA. It is also a more economical use of co-firing small (5% to 10% of the total heat input) quantities of biomass with coal, instead of co-firing the biomass with the main burner. These advantages outweigh the greater flame non-uniformity and the possible need for installing additional access openings on the upper boiler wall with these dry, pneumatically fired fuels for staged reburn $NO_x$ control.

The second situation applies to $NO_x$ control in cyclone combustor, utility boilers that are fired with crushed coal. These slagging combustors must operate at excess air conditions to efficiently burn the crushed coal whose mean size is about 0.5 millimeters. This coal particle size is much too large for use as a reburn fuel. As noted in the Prior Art discussion section of this invention, one costly prior reburn $NO_x$ control method (U.S. DOE Report No. DOE-FE-0387, March 1999, pages 5–46 to 5–49), utilized coal pulverizers to produce sufficiently fine coal particles suitable for reburn. For the present invention, a simpler solution is disclosed, namely, crushed coal is pyrolized or partially gasified by drawing hot, nominally 2000° F., combustion gases from the boiler. This releases most of the volatile matter in the coal, which is typically 20% to 40% of the weight of coal. This gas is used for staged reburn combustion to reduce $NO_x$ in the combustion gas downstream of the main combustion zone. The residual char is withdrawn from the packed bed or fluidized bed and it is pneumatically fed into the primary slagging cyclone combustor. The presently disclosed process eliminates the need for additional pulverization of the crushed coal.

The same process can be utilized with large particle (greater than the above-noted biomass) wood chip residue from forest products in which the volatile matter, equal to about one-half of the total wood weight, is pyrolized or partially gasified for use as the reburn fuel. The residual char is fed into the primary burner zone of the boiler or into a cyclone combustor. Due to the high reactivity of this type of char, it may also be suitable for injection into the primary combustion zone in conventional pulverized coal fired boilers.

Further details for implementing the gaseous or dry biomass reburn method will be given after a detailed description of the preferred liquid reburn fuel method.

A preferred embodiment with a liquid reburn fuel, namely oil or a solid fuel-water slurry, is to inject the fuel droplets in a flat fan, approaching 180°, spray pattern using a flat plane injector. This type of injector is similar in design to the Model SU 89 injector of the Spraying System Company, Wheaton, Ill. This injector produces a flat spray of droplets having a mean size of several 100 microns. This spray pattern allows a nearly complete coverage of the furnace cross-section with a minimum number of injectors, typically, less than one-half dozen injectors for a 100 MW boiler. Hydraulic atomizing injectors, such as the McMaster-Carr Company's (New Brunswick, N.J.) Catalog 3404Kxx series, where xx are the digits for the different capacities available, also result in a flat fan spray of up to a 120° included angle. Here the mass flow rate increases with increasing pressure and as noted the droplets are substantially larger than with air atomizing injectors operating at the same pressures.

By incorporating an outer water cooling annulus around the water and air delivery ducts to the injector head, it is possible to insert the injector head deep into the boiler furnace without boiling the aqueous solution in the feed pipe. Boiling produces steam in the feed pipe, which blocks the steady flow of liquid. Therefore, cooling of the feed pipes is an essential element in practicing this invention under conditions where the injector is inserted into the hot gas stream The ability to insert the injector head into the hot gas stream provides great flexibility in assuring complete coverage of the droplets in the furnace injection zone. The reason for inserting the droplet injector head into the hot combustion gas is that the gas temperature near the wall is 100's of degrees lower than in the central core. As a result, the reburn combustion rate will decrease near the boiler wall.

It is very important to note that both the air and aqueous mixture feed pipes must be water-cooled. The air pipe must be cooled to prevent the air from being heated much above the boiling point of the aqueous solution. In that case, the hot air will turn the droplets into steam inside the injector heat and interfere with the operation of the spray atomizer. The need for external cooling of the aqueous solution feed pipe is subtler. One can design a particle-water mixture so that the flow rate of the mixture is high enough to maintain the temperature in the liquid feed pipe below the boiling temperature. This is the approach proposed by Zauderer in U.S. Pat. No. 6,048,510. However, the cooling flow rate is determined by the heat transfer rate from the furnace gases and walls to the injection pipe. This rate may very well differ from the optimum flow rate for injection of the water-reagent mixture. By adding a water-cooled outer annulus, the flow rate for cooling the water-particle mixture and the flow rate for the water-particle mixture injection into the furnace can each be optimized independently.

Another aspect of practicing the present invention with liquid droplets as the fuel medium is the need to maintain the coal particles in suspension in the oil or water from the time the mixture is prepared until the time when the droplets are vaporized in the furnace. Due to the insolubility of coal in water or oil it is necessary to continuously stir the tank in which the mixture is prepared to achieve a uniform dispersion of the particles in the water. In addition, the concentration of the particles must be kept low enough to prevent the formation of a highly viscous mixture that cannot be readily pumped and atomized. One means of assuring a uniform dispersion is to add a surfactant and stabilizer, an approach that has been widely used to prepare coal-water mixture having up to 70% coal particle concentration by weight. These mixtures remain in suspension for extended periods measured in days, a condition that was necessitated by the need to ship the coal-water slurry to distant boiler systems. However, as uniform dispersion is only required from the mixing tank to the injector head in a boiler plant, the amount of surfactant and stabilizer needed, if any, will be far less than with coal-water slurry. Furthermore, the higher the concentration of suspended particles in the water, the more viscous and non-Newtonian the liquid mixture becomes. While 70% solid coal particle concentrations in coal-water slurries have been widely used and fed into air atomized burners, it is preferred to practice this invention at lower solids concentrations in the droplets. Specifically, solids concentrations up to 30% are preferred because they allow the use of low cost centrifugal pumps, and to at most 50% solids, which require progressive cavity pumps, but which have lower boiling heat losses.

Prior art on coal-water slurries, CWS, can be used as a basis for specifying the characteristics of the water-particle mixture needed to practice the present invention. A major difference between the present use of CWS and prior art CWS combustion is that in the latter case efficient combustion was desired in a relatively small flame zone near the injection point, which requires small droplets with a narrow size distribution. For the present invention, it is necessary to project the droplets into the large upper furnace zone of a boiler, and a wide droplet size distribution is required. Also, for the same size boiler, the prior art CWS mass flow rates were very much greater than those required for the present invention because the prior art CWS was the primary fuel for the furnace or boiler. In the present case, CWS fuel flow rates are in the range of 5% to at most 20% of the total heat input. In addition, prior art CWS was prepared at central locations for transport to dispersed boilers where multi-day storage was required. The need to maintain multi-day storage required the use of relatively costly surfactants and stabilizers. On the other hand, in the present invention, the water-particle mixture can be prepared as it is being consumed. All these factors favor a substantially lower particle concentration in the liquid that will require little or no additives to keep the particles in suspension between the preparation vessel and the injector nozzle.

For the above reasons, prior art on CWS is only a guide on how to practice the present invention. As with CWS, in practicing this invention the coal particles must remain in uniform suspension from the time they are mixed with water to the time they are injected in the furnace. The simplest solution is constant stirring of the mixture. Since it is anticipated that this time will be less than a minute, the particles should remain dispersed, especially if the concentration is 25% to 30% by weight. In the development of the combined $NO_x$ and $SO_2$ reduction process, it has been found that up to 30% lime in water could be maintained in uniform dispersion with vigorous, continuous mixing, without the use of any stabilizers and surfactants. Above 30%, the viscosity of the lime-water mixture increased to such a high level as to lose almost all fluidity. Lime, like coal, is not soluble in water, and in view of the high cost of these two additives, it is preferred to practice this invention without the additives and use solids loading up to 30%. It may be possible to maintain fluid properties at concentrations above 30% without additives.

Higher concentrations may be desirable because high water injection rates into the boiler will lower the gas temperature. In that case solids concentrations as high as 50% may be warranted, and CWS data is relevant. For example, J. L. Morrison, et.al. (Referenced below) reported on a typical surfactant used with CWS, namely an ammonium based, sulfonated naphthalene condensate, marketed under the trade name Coalmaster A-23M by Henkel Corporation. It was found that its addition to the CWS in concentration of 1% by weight yielded the minimum viscosity, which is desired to minimize pumping power and droplet size. In addition to maintain the coal particles in suspension for many days, a stabilizer, Xantham Gum, marketed under the trade name Flocon 4800C by Pfizer Corp., was used at concentration of under 400 parts per million to keep the particles dispersed in water. The same study reported that at 65% solids loading, the viscosity of the CWS was about 800 centipoise (cp), and it decreased to 200 cp at 55% solids loading. (The viscosity of water at 20° C. is only 1 cp.) (J. L. Morrison, et.al, "Preparing and Handling Coal-Water Slurry Fuels" in *Proceedings of the 18th International Conference on Coal Utilization and Fuel Systems*, Clearwater, Fla., Apr. 26–29, 1993, pages 361 to 368, ISDN 0-936066-18-8. Also, K. D. Kihm, et.al. "Investigation of Dynamic Surface Tension of Coal-Water Slurry Fuels for Application to Atomization Characteristics" pages 637–648 in the same Proceedings, discuss additional surfactants that can be used.) It is understood that these references are selected as typical from the literature on CWS, and not meant as preferred chemicals for practicing the present invention.

Another issue is the impact of the solids particle loading in the droplets on the droplet size. As will be discussed below, practicing the present invention preferably requires droplets between 10 to 1000 microns. J. Ren, et.al (The Atomizing of DZ-Type CWS Atomizer"in *Proceedings of the 18th International Conference on Coal Utilization and Fuel Systems,* Clearwater, Fla., Apr. 26–29, 1993, pages 669 to 678, ISDN 0-936066-18-8) report that air atomization with multiple air jets impinging on the CWS flow inside the liquid feed pipe of the injector resulted in droplets with 100 Sauter Mean Diameter, SMD, for viscosities of about 700 cp. It decreased to about 40 to 50 SMD for viscosities of about 200 cp. (SMD is the diameter of a drop having the same volume-to-surface area as the total volume of all drops to the total surface area of all drops.) These droplets sizes are well below the mean size required to practice the present invention in large utility boilers, as discussed below. This means that the solid particle concentration range for practicing this invention, preferably up to 30% to at most 50%, will yield the droplet sizes necessary to cover the entire combustion gas area being treated for $NO_x$ control.

Another area that the solids concentration impacts the practicing this invention is pumping the CWS mixture. The prior art in CWS used progressive cavity, gear pumps to feed the CWS to the injector. These pumps are substantially more costly than conventional centrifugal pumps. I have found that with up to 30% lime concentration in water, the effective viscosity of the mixture was only about 30 cp, i.e. very much lower than the viscosities quoted in the prior art on CWS. This allowed the use of conventional centrifugal water pumps even for pumping the 30% lime-70% water mixture over distances in excess of 100 feet vertical elevations. This result provides another reason for preferring lower concentrations of coal in the CWS used to practice this invention for coal fired reburn. The pump selection is issue will be discussed in connection with FIG. 4 below.

In summary, key differences between the present invention and CWS technology are as follows: Much lower mass flow rates in the present invention allow preparation of the mixture at the boiler plant site. It allows economical operation at reduced solids concentrations in the liquid, which reduces the viscosity, the pumping power, and reduces, and probably removes, the need for additives to maintain the solids in uniform dispersion.

In view of the importance of the droplet size distribution in practicing this invention, the core elements in the analysis for determining the droplet size will be briefly summarized. Further details are found in Zauderer (U.S. Pat. No. 6,048, 510). The following discussion applies primarily to solid fuel particles dispersed in water. In the case of oil droplets or oil-coal particle slurries, combustion of the oil occurs at the droplet surface as soon as it vaporizes. This will accelerate the droplet vaporization and reduce the penetration distance of the droplet into the combustion gas stream.

The transport of droplets is governed by the equations of motion for a spherical particle subject to aerodynamic drag. The vaporization of the droplet in a hot combustion zone is governed by the convective, radiative, conduction, and boiling heat transfer relations as described in standard texts on heat transfer, [for example, see *Heat Transmission,* W. H. McAdams, (McGraw Hill, NY 3rd, Edition, 1954, or *Heat, Mass, and Momentum Transfer,* W. M. Rohsenow and H. Y. Choi (Prentice-Hall, Inc, Englewood Cliffs, N.J., 1961))]. To practice this invention, the water droplets are injected at the 2000 to 2500° F. combustion gas temperature, where the reburn $NO_x$ reaction is optimum.

The droplets, which are at ambient temperature when injected into the hot combustion gas, will remain in the liquid phase until the droplet's surface temperature reaches 212° F. The droplet is heated by convection and radiation from the gas (radiation from the wall can be generally neglected in large furnaces) as it traverses the hot gas. The rigorous analysis of the physical phenomena that the droplets undergo in the combustion gas involves extensive, but standard, heat and mass transfer analyses. However, it is possible to practice the present invention by examining the relative effects of the following phenomena:

The equation for convective heat transfer, $Q_v$, to the liquid droplet, prior to its vaporization, is given by $$Q_v = h*A*(T\text{gas} - T\text{drop}),\ \text{Btu/time} \quad (1),$$

where T gas is the gas temperature, preferably 2000 to 2500° F., T drop is the water droplet surface temperature, between ambient and 212° F., A is the surface area of the droplet, and h is the convective heat transfer film coefficient at the droplet surface. For a spherical droplet, h can be computed from the dimensionless Nusselt number, Nu, which for small droplets of present interest is about equal to 2. The definition of the various dimensionless heat transfer terms are found in any heat transfer book, such as McAdams, cited above, and will not be repeated here. The film coefficient, h, computed from Nu, is inversely proportional to the droplet diameter, $D_p$.

In addition, the droplet is also subjected to radiation from the furnace walls and the hot gas. The wall radiation can generally be neglected compared to the gas radiation. Assuming a reasonable emissivity of 0.2 for the gas at a temperature of 2000° F., one finds that for droplets up to 100 microns the radiation contribution is less than 3% of the convective contribution. At 400 microns, it is 50%, while at 1000 microns it is 3 times greater than the convective term. However, this simplified analysis of the radiation term may well be an overestimate since water is highly transparent to visible radiation, and may even be transparent in the infrared.

The next issue that must be addressed in connection with the water droplets is the rate of penetration of the droplet's surface temperature into its interior as the droplet penetrates the combustion gas. Once the surface temperature reaches 212° F., the surface begins to boil. If the rate of penetration of temperature is extremely rapid, the droplet will most likely explode. Analytical solutions of the transient temperature penetration into a liquid or solid sphere are given in both McAdams and Rohsenow, cited above. The rate depends on two dimensionless numbers, the Fourier number, Fo, and the Biot number, Bi.

Fo is proportional to the thermal diffusivity of the water droplet and the time of penetration, and inversely proportional to the droplet radius squared. Bi is proportional to the product of the droplet radius and the combined surface convective and radiative film coefficient, h, as given above, and it is also inversely proportional to the thermal conductivity of water. Due to the low value of the thermal conductivity, the Biot number is equal to 0.1 when the contribution of radiation is negligible, and less when the radiation contribution is significant. In either case, the transient solution for spheres in the size range of 10 microns to 1000 microns as deduced from data curves in McAdams or Rohsenow, show that the surface temperature penetrates very slowly into the interior of the droplet. This is due to the low value of the water thermal conductivity.

This is a very important result because it indicates that the vaporization of the droplet will proceed from the surface into the interior. Therefore, to assure wide distribution of the dispersed coal particles in the water droplet, the droplet should be large enough to allow maximum penetration into the proper temperature zone. This will also minimize the number of injectors required.

The above discussion has focused on coal particles dispersed in water droplets. In reducing this invention to practice oil was used as the reburn fuel, and here the situation is somewhat different. In the case of hydraulic atomization of the oil, the most important element in assuring effective atomization is to operate the oil injector within its design range, which for the injectors used was between 40 psig and 100 psig. Too low a pressure resulted in a poor atomization and a poor flame pattern that was limited to the immediate outlet of the injector. Compressed air atomization of the oil, which was briefly tested, yielded effective atomization over a very wide fuel oil flow range. However, it was very much more costly in injector price and in compressed air power consumption and it was soon eliminated.

The next step in practicing this invention is to determine the time required to vaporize various size water droplets. This time may be estimated by computing the time required for the convective and radiative heat transfer to the droplet surface to boil the droplet, using about 1000 Btu/lb as the heat of vaporization. For droplets in the range from 10 microns to 1,000 microns, Table 1 shows that the time increases from 0.3 milliseconds for 10 micron to 92 milliseconds for 1,000 micron, diameter droplets. As noted, since the vaporization is a surface phenomenon, the pulverized coal particles dispersed in the droplet will evolve from the surface of the droplet into the gas stream. This is opposed to local explosive vaporization if the entire droplet's temperature rapidly reached 212° F., which would have been the case if the Biot number had been much larger.

Having determined the heating process from the combustion gas to the water-coal droplet, the next step is to compute the fluid mechanic aspects of the droplet. A sphere flowing through a gas stream is subject to a drag coefficient that is a function of the Reynolds number of the droplet in the gas. As given by Rohsenow, the drag coefficient decreased from 10 for a 10 micron particle, to 4 at 50 microns, to 2 at 100 microns, to 1.5 at 400 microns, to 0.5 at 1,000 microns. These values apply to droplets injected at a typical velocity for the injectors used of 176 feet per second into the 2000° F. combustion gases.

To further clarify how to practice this invention a specific air atomized injector that was used by Zauderer (U.S. Pat. No. 6,048,510) will be used to illustrate how to practice this invention. Air atomized, water droplet nozzles such as those manufactured by the Spraying Systems Company, Wheaton, EL will be used for this description.

Method 1: The use of a coal-water slurry in an air or steam atomized injector is the preferred method, from an economic point of view, of practicing this invention for $NO_x$ control with staged reburn combustion. However, the wide range of boiler or furnace ratings, the widely different fuel types, the widely different fuel preparation methods, and fuel storage options at these furnaces and boilers, indicate that this invention can be practiced with different methods. The core element of this invention is to assure that the excess air, combustion gases that contain high $NO_x$ concentrations be uniformly converted throughout the appropriate gas temperature zone to slightly fuel rich conditions by the addition of reburn fuel, using the cheapest option available at the particular boiler or furnace. Prior art has focused on the use of costly natural gas, which results in lower uniformity of fuel rich combustion throughout the treated gas zone, or dry pulverized fuel injection, which requires the use of additional costly pulverizers to reduce the coal particles to sizes suitable for rapid combustion, and which also results in lower uniformity during fuel rich reburn combustion.

Therefore, depending on technical and economic factors at a given boiler or furnace site, four additional fuel and fuel preparation methods suitable for practicing the present staged reburn combustion process for $NO_x$ control will be described below in connection with the various figures that describe how to practice this invention.

Method 2: Another method that requires less equipment and is easier to operate is to use fuel oil for reburn. In one version, air or steam atomization is used with the same injectors as in coal-water slurry or oil-water slurry. The droplet size distribution would be in the same 10 to 1000 micron size range as with the slurries in order to achieve uniform, fuel rich combustion throughout the zone being treated for $NO_x$ reduction. In view of the fact that reburn fuel heat input is preferably in the range of 10% of the total heat input to the boiler or furnace, the added cost for equipment needed to use an oil-coal particle slurry is almost certainly not economically warranted. Furthermore, the cost of hydraulic atomization of oil is so much lower than air or steam atomization that its use is preferred. Initially Method 2 was reduced to practice with compressed air atomization of the oil using various injector designs. Subsequently, hydraulic atomization was used because these injectors were very low in cost. The tests with both types of injectors were conducted in a 17,500-lb/hr water tube boiler, and they will be discussed below. While oil costs more than coal or biomass, the simplicity of this system, including the lower cost of fuel oil storage and transport make this option attractive in cases where fuel costs and existing oil storage tanks are already in place. Furthermore, heavy oil, No.6 grade, is much lower in cost than light oil, No.2 grade. Heavy oil must be heated to assure appropriate viscosity for atomization. Heavy oil contains high sulfur levels. However, the sulfur can be partially removed either with $SO_2$ scrubbers already in place at a coal fired plant, or by using a post-combustion process, such as a lime injection process.

Method 3: Another staged reburn NOx control method is to inject dry pulverized coal that is diverted from the coal pulverizers that feed the primary burners in the furnace or boiler. The pulverized coal is withdrawn from the primary mill and it is stored in separate bins, from whose bottom the coal is metered and fed pneumatically to the boiler reburn zone. This method is suitable for boilers that use pulverized coal fired boilers, have large enough access ports in the upper boiler wall to reduce or eliminate the need for adding additional access ports, and require less $NO_x$ reduction from the reburn process. They are, therefore, not as sensitive to reburn combustion non-uniformities.

Method 4: Another reburn method is to use pneumatically fed, dry biomass. This biomass can be obtained from agricultural residue, such as shredded grain stalks, rice husks, sugar cane stalks, or forest product residue, such as small wood chips, wood shavings or sawdust, or animal product residue, such as dried chicken waste. Al these materials can be fed pneumatically without processing beyond drying and shredding. Their heating value is about one-half to two-thirds that of coal, and the bulk density of these biomass materials is as much one-fifth that of pulverized coal. Therefore, biomass requires larger pneumatic feed pipes and it will result in greater reburn combustion non-uniformities than dry coal firing. Offsetting these disadvantages are the reduced carbon dioxide, greenhouse gas emissions from these renewable fuels.

This method was also tested in the 20 million Btu/hour combustor using sawdust that was pneumatically injected into the combustor and up to 50% reduction of $NO_x$ was achieved.

Method 5: Another method for practicing this $NO_x$ control reburn process is to utilize pyrolized gas or partially gasified gas from crushed coal, used in commercial cyclone fired boilers, or biomass that cannot be shredded for direct feeding into the furnace, such as large wood pieces. In this case, further pulverization as described above for prior art requires very costly additional equipment. Further size reduction of large wood pieces is also not economically feasible. In this case, pyrolysis or partial gasification is a very attractive option. As little as 5% to 10% of the total fuel input to the boiler can yield substantial $NO_x$ reductions. Pyrolysis of biomass to temperatures of 1000° F. will evolve 50% of the total fuel weight as a gas. Pyrolysis of coal to 1300° F. will evolve the volatile matter that is about 30% to 35% of the total coal mass. The energy needed to reach this temperature can be obtained by drawing combustion gases from the upper cooler regions of a furnace or boiler and passing it through a packed bed or fluidized bed. The residual solid char in the pyrolizer vessel is fed pneumatically into the slagging cyclone combustor. Therefore, this $NO_x$ control staged reburn process is preferred for the cyclone combustor fired boilers.

Figure 1A:
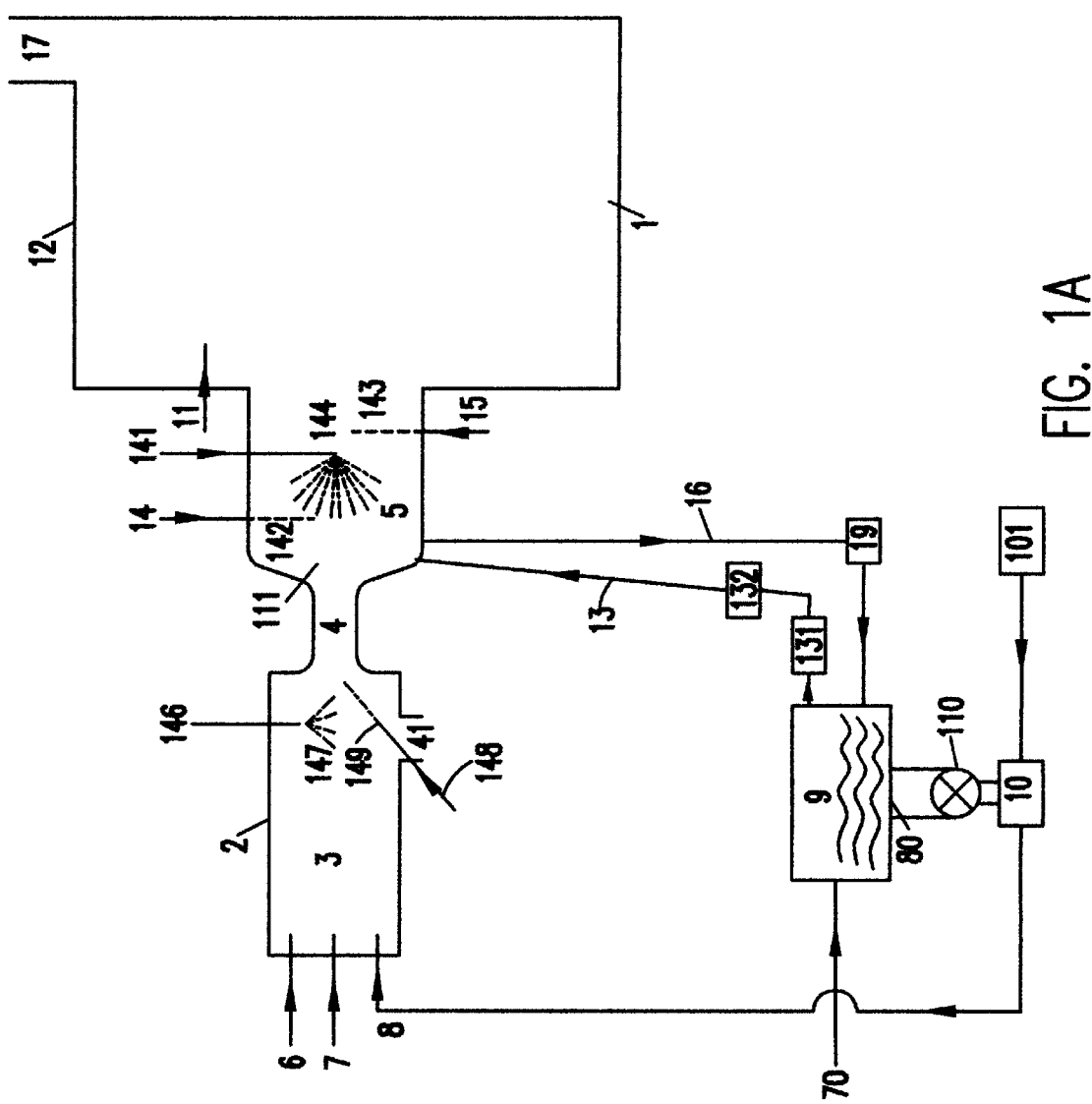

The means for implementing all the above staged reburn combustion processes for NOx control is described with reference to the following figures:

Zauderer (U.S. Pat. No. 6,048,510) has utilized a 17,500 lb/hr, saturated steam boiler, FIG. 1, manufactured by the Keeler Boiler Company in Williamsport, Pa. in 1970 to practice the SNCR NOx control processes. This combustor-boiler was also be utilized to practice several of the methods disclosed in the present invention, and it can be used to practice all the methods disclosed herein. Referring to FIG. 1A, a cyclone combustor 2 communicates with boiler 1 having furnace wall 12 and an exhaust 17 to the stack. The combustor 2 consists of two chambers, a primary chamber 3 where in accordance with well known practice, a pulverized coal 7 representing between 80% and 90% of the total heat input to the boiler is introduced along with sufficient primary (and any secondary) air 6 into combustor 2 to produce excess air combustion in chamber 3. With the combustor design used in reducing the present invention to practice, an exit nozzle 4 at the outlet of the combustor whose function is to recirculate the combustion gases in order to retain most of the ash in the coal particles as liquid slag which deposit on the ceramic lined inner wall of chamber 3, and flow down the wall to an opening 41 in the floor of chamber 3 that is located at its downstream end. The combustion gases pass through a second chamber 5 and then flow into the boiler 1 whose walls are lined with water-steam filled pipes. The boiler's water-steam pipes absorb about 80% of the combustion gas energy before the gas exits opening 17 in a duct that leads to the stack. The inner walls of chambers 3, 4, and 5 are lined with refractory material. The back of this refractory wall is lined with a series of metal pipes that are parallel to the combustion chamber axis. Metal studs welded to the inside section of these pipes hold the ceramic wall in place. The design of the inner wall of chamber 3 is described in Zauderer's U.S. Pat. No. 4,624, 191, which is herein incorporated by reference. All or part of the cooling air of chamber 3 is recycled as secondary combustion air 6 into the combustor. For practicing U.S. Pat. No. 6,048,510 on SNCR $NO_x$ reduction, the design of exit nozzle was changed from the design shown in U.S. Pat. No. 4,624,191 to an air-cooling design similar to that lining chamber 3, and both of these patents are hereby incorporated by reference. The cooling air exited from the pipes that surround exit nozzle 4 pipes into chamber 5. For practicing the present invention an additional modification was made in that the air cooling pipes were extended from the outlet of exit nozzle 4 and directed along the inner wall of chamber 5 to exhaust into the furnace section of boiler 1, as shown schematically by 11 in FIG. 1A. The function of the air flowing out of openings 11 into the furnace section of boiler 1 is to complete the combustion of the fuel rich gases exiting from the reburn process in chamber 5. A ceramic material was placed on the inner side of these pipes, which completely surrounded the inner walls of chamber 5. The walls of the chamber 4 and 5 can be air cooled as discussed in U.S. Pat. 4,624,191 which is herein incorporated by reference.

Additional fuel, representing between 5% and 30% of the total heat input to the boiler, was introduced into chamber 5 to produce slightly fuel rich, reburn conditions. The latter convert some of $NO_x$ produced from the fuel bound nitrogen and high combustion gas temperature during the fuel lean combustion in chamber 3, into nitrogen. Preferably, the combustion gas temperature in chamber 5 should be as low as 2000° F., and no more than less than 2500° F., to prevent the final combustion gas temperature at the inlet to boiler 1 from becoming high enough to produce thermal $NO_x$, which will occur at gas temperatures of about 3000° F., or higher.

The air-cooling pipes in the wall of chamber 5 were made of ordinary low carbon, steel, which is not resistant to high temperature operation. As a result, the pipes lining the upper half of chamber 5 rapidly corroded and fell down. Consequently, in later tests in the development of the NOx control reburn process, the reburn fuel was introduced either with injector 146 through a port in the downstream roof of chamber 3 or with an injector 148 through opening 41 in the floor at the downstream end of chamber 3. In this case, the final combustion air for the fill rich combustion gases leaving exit nozzle 4, was provided primarily by the pipes 111, whose outlet covered the upper half of the outlet plane of chamber 4.

The means of introducing the added reburn fuel depends on the reburn fuel addition method being used. The preferred Method 1 uses a coal-water slurry or coal-oil slurry that is injected though a steam or air atomized injector 14 to yield a flat plane flame 142 that is perpendicular to the combustion gas flow direction, as shown in FIG. 1A. In this case final combustion is provided by the airflow 11 exiting the pipes that surround chamber 5.

Alternatively, the same injector 14 can be used with Method 2 to introduce fuel oil into chamber 5 in the same flat plane flame 142 pattern. Final combustion is the same as in Method 1.

Alternatively, the fuel oil of Method 2 or the fuel slurry of Method 1 can be injected through injector nozzle 146 to form a conical or flat spray flame pattern 147 at the downstream end of chamber 3. In this case final combustion with the air exiting pipes 111 occurs in chamber 5.

Or, alternatively, dry pulverized coal using Method 3 or dry finely shredded biomass using Method 4 can be injected pneumatically through nozzle 15 in a flat plane flame 143 perpendicular to the gas flow direction into chamber 5. Final combustion is the same as in Method 1.

Or, coal or biomass for reburn can be pneumatically blown into the downstream end of chamber 3 through pipe 148 to form a flame pattern 149 in chamber 3. In this case final combustion with the air exiting pipes 111 occurs in chamber 5.

Or, alternatively, Method 5 can be used to introduce pyrolysis gas or partially gasified fuel gas 13 through an injector into chamber 5. Final combustion with the air exiting pipes 11 occurs in the boiler 1. This gas 13 is produced by drawing a small quantity of hot combustion gas 16 from chamber 5 into a packed or fluidized bed 9 that contains coarse crushed coal 70, with said gas 16 blown into chamber 9 by means of a steam jet siphon 19, such as Siphon 220 from Ketema Inc.'s Schutte-Koerting Division, Bensalem, Pa., suitably modified by high temperature materials, such nickel-chrome alloys, and component cooling. The siphon is powered by steam drawn from the boiler. Alternatively, a device called-a transvector 19, such as supplied by Vortec Corporation, Cincinnati, Ohio, suitably modified for high temperature operation and powered by compressed air, can be used in place of the siphon to move the hot combustion gas. Another alternative is to use a high pressure fan or blower 132 to draw gas 13 from pyrolizer/gasifier 9 after cooling of the pyrolysis gas in a heat exchanger 131 to a temperature compatible with fan or blower materials. The residual char 80 drops through a rotary valve 110 into an eductor 10 that is driven by an air blower 101, and it is injected into chamber 3 of the cyclone combustor 2. Instead of coarse coal, biomass that is unsuitable for fine shredding, such as large wood chips, can be used as the feedstock for pyrolizer/gasifier 9.

The description for implementation of Method 5, as given in FIG. 1A, can also be practiced in large utility boilers fired with cyclone combustors, using coarse coal as the fuel. Due to the relatively low volatility of coal, it must be heated to about 1300° F. to volatilize typically 35% of the coal mass. As a result, economic considerations limit the reburn fuel input to only about 5%, which will result in about 15% of the total coal input to the boiler being fed to the gasifier/pyrolizer. For 10% reburn gasified fuel input to the boiler, about 30% of the coal input to the boiler would have to be fed to the input to the boiler, about 30% of the coal input to the boiler would have to be fed to the gasifier/pyrolizer vessel, which would be relatively costly. On the other hand, with biomass fuel input for reburn, about 50% of the fuel mass is volatilized at only 1000° F., and under these conditions, it may be economically attractive to use biomass pyrolysis gas as the reburn fuel, with the char fed into a coarse coal slagging cyclone combustor. However, even in this case, the use of shredded biomass would be preferable than using biomass that requires pyrolysis for use as a reburn feedstock.

In reducing this invention to practice, oil was used as the primary fuel, instead of coal, and it was injected into combustion chamber 3 of FIG. 1, through one of the coal ports or through an air atomized oil burner inserted near coal port 7. To increase the NOx to a level that better approximates those measured with coal combustion, an aqueous solution of 5% to 10% ammonia was also injected near the oil injection port 7. In the initial tests, reburn fuel oil was injected into chamber 5 with an air atomized injector 14, whose outlet ports were as shown in FIG. 2D, or injector 141 with outlet ports of FIG. 2C, to produce either a flame front 142 perpendicular to the gas flow direction or a conical flame 144, co-axial to the gas flow direction and facing upstream. The injector 141 was also inserted at the location of injector 14 to produce a conical flame pattern perpendicular to the gas flow direction. In general the flame pattern obtained with oil reburn was much less important to the degree of NOx reduction than assuring that most of the combustion gas flow in the reburn chamber was converted from fuel lean to fuel rich.

Results of tests in the 20 million Btu/hour combustor-boiler of FIG. 1 that were made to reduce this invention to practice will be discussed below.

FIGS. 2A and 2E show injectors by which oil, coal-water slurries, oil-water-slurries, dry shredded biomass, dry pulverized coal, or pyrolysis gas can be injected into the reburn zone of a furnace or boiler. Injector nozzles 14, 141, 146 in FIGS. 1A and 1B, and 310 or 312 in FIGS. 3A and 3B each consist of an injector assembly 21, shown in FIG. 2A and 2E, that contains a pressurized air or pressurized steam pipe 22 and a pressurized oil or slurry pipe 23, which feed to the rear of an injector head assembly 210 that directs the compressed air or steam and liquid fuel to an internal atomizing mixing chamber that has one or more spray outlets 25, 26, or 211 constituting one or more openings, depending on the spray patterns desired, such as shown in FIGS. 2B to 2D. In FIG. 2A, the air or steam pipe 22 and the liquid fuel pipe 23 extend side by side parallel to one another, and they are each surrounded by a coaxial and concentric pipe 28 for pipe 22 and 29 for pipe 23 through which cooling water flows in the direction of the internal air or steam and the liquid fuel pipe and exits though an annular opening between the end of pipe 28 and 29 and the rear of injector head assembly 210. The resultant water spray exiting through this gap, which is typically about ¼ inch in length, discharges into and vaporizes in the combustion gas in the furnace and it also impinges on the rear of assembly 210, thereby evaporatively cooling it. However, the external cooling pipe around the liquid can be eliminated if the liquid fuel flow rates are high enough to keep the liquid from evaporating in the feed pipes. Also, the air or steam-cooling pipe can be eliminated if the injector is near enough to the boiler or furnace wall to prevent the liquid fuel from significantly evaporating inside the internal air or steam and liquid fuel atomization chamber. They can also be eliminated if the liquid pipe 23 is placed outside the air pipe 23 to cool the air, as shown in FIG. 2E When the injector assembly 21 in FIG. 2A is inserted in the 2000° F. combustion gas in a furnace or boiler it is subject to heating from the gas stream. In large boilers, the air and liquid slurry feed pipes to the injector are inserted perpendicular to the gas flow and the heat transfer to the outside of these pipes is computed from heat transfer analysis of gas flow normal to a cylinder, as given by McAdams. For typical boiler furnace conditions, the external film coefficient is in the range of 15 to 25 Btu/(hr-ft$^2$-° F.). The flow in the water-cooled pipes surrounding the air and liquid slurry injector feed pipes is designed to keep this cooling flow well below the boiling point of water.

The liquid fuel mixes with the high-pressure air or steam in a chamber inside injector head assembly, then is discharged from injectors 14 or 141 or 146 in FIG. 1 and 310 or 312 in FIG. 3 as atomized liquid droplets 24. The injectors 14, 141, 146, 310 and 312 are thus two-fluid atomizers. Although not shown, assembly 210 consists of several stainless steel components that are sealed with copper gaskets. The cooling water 27 as well as the aqueous-solid mixture 23 assure that this entire assembly can withstand insertion in the nominal 2000° F. to 2500° F. combustion gas stream in the boiler.

In any event, the droplet laden air or steam 24 flows out of chamber 210 and into zone 5 or downstream in chamber 3 in FIG. 1 where it intercepts the combustion effluent gas stream at the optimal temperature for the staged reburn combustion to yield a slightly fuel rich gas temperature zone, e.g. between 2000 and 2500° F. One spray pattern is a round spray in which the droplet laden air exits from a single orifice 211 out of the mixing chamber 210, as shown in FIG. 2B. This produces a very narrow spray angle α in FIG. 2A. A wider spray angle α can be achieved by using an outlet consisting of a series of orifices 25 placed equidistant at an angle β of 60° to 70° to the nozzle axis I—I, in FIG. 2E. Both spray patterns were used in the tests on the 17,500 lb/hr steam boiler byZauderer (U.S. Pat. No. 6,048,510). It will be understood, however, that the outlets 25 indicated in FIGS. 2C and 2E are merely illustrative, and not required, as the outlet 26 or 211 arrangements can also be used in the injector configurations shown in FIGS. 2A and 2E.

For testing the prior invention (U.S. Pat. No. 6,048,510) and the present invention in the boiler shown in FIG. 1, the assembly 210 provided by the Spraying Systems Company was used. Specifically, for outlet configuration 211 of FIG. 2B, Spraying System model setup No. SU22, for outlet pattern 25 in FIG. 2C model setup SU29, and for outlet pattern 26 of FIG. 2D, model setup SU23 can be used. These setups were each connected to the ¼JBC injector body, which consists of a rear air inlet for pipe 22, and a rear aqueous mixture inlet 23 with a ¼ inch NPT pipe thread. The SU22 produces a narrow spray through one exit orifice, while the SU29 produces a wider-angle spray through six exit orifices, and the SU23 produces a flat fan spray pattern. As explained above, the latter is inserted in the reburn chamber 5 in FIG. 1A as element 14 and it intercepts the combustion gases exiting the primary combustor 3 in a plane 142 perpendicular to the gas flow axis. Alternatively, one uses the other two spray patterns from FIGS. 2C and 2B in location 141 of FIG. 1 by inserting the spray nozzle assembly through the roof of chamber 5 and directing the injector head into the upstream direction to produce a conical spray pattern 144 in the centerline of the combustor axis. Note, however, that one can also utilize the spay patterns of FIGS. 2B and 2C by inserting these injectors through the same location as injector 14 and producing a conical spray 142 whose axis is perpendicular to the combustor axis. This was tested and found to actually be preferable to the flat plane injector, presumably because the flame filled a larger volume of the reburn zone in chamber 5.

According to the Spraying Systems Company, in laboratory tests injecting into ambient air conditions, nozzle setup SU22 produces a 9 inch wide spray pattern 24 inches from the outlet orifice (about 20° included angle), with 40 psig air and 30 psig water, SU29 yields a 13 inch wide spray at only 15 inches from the outlet (about 50°) at 42 psig air and 20 psig water. In both cases the spray pattern widened at a very small angle, reaching a maximum penetration of 20 to 30 feet. The mean water droplet diameter for the SU29 nozzle was 30 microns at 46 psig air and 30 psig water, and it increases linearly on semilog plot to 70 microns as the air pressure is lowered to 20 microns. At higher air and water pressures, the droplet size decreases. For example, at 85 psig air and 60 psig water, it is only 19 microns. The wider spray of the SU29 nozzle setup was found by Zauderer (U.S. Pat. No. 6,048,510) to produce higher $NO_x$ reduction than the narrower single outlet spray of the SU22 injector.

The flat spray pattern from SU 23 produces, according to Spraying Systems, a 17 inch-wide spray at 15 inches from the nozzle outlet. This yields an included angle of about 60°, not much greater than the conical spray SU29's angle of 50°. Since the outlet 4 of the combustor 2 in FIG. 1A is only 17 inches wide, the flat spray width of 17 inches for the SU23 is sufficient to intercept the entire gas flow exiting from combustor 2. The flat spray is produced by slit 26 in FIG. 2D. This flat spray allows placement of the injector assembly 210 at the outer edge of the reburn gas zone 5 to intercept the entire exit nozzle outlet 4. This is preferred to placing a conical outlet injector 141 in the center of the gas exhaust to produce a spray pattern 144. However, it was found that the conical spray of FIG. 2C, inserted as injector 14 with the injector outlet at the outer diameter of nozzle 4 was better than the flat spray because it filled a larger volume of gas than the flat spray. On the other hand for larger injectors, which must be used in large boilers, the flat spray produces a substantially wider spray pattern than the conical spray. For this reason, it was of interest to evaluate the flat spray patterns in a small boiler. By adjusting the fuel input and the air to fuel ratio one can duplicate the gas temperature conditions found in the reburn zone in large boilers either in chamber 5 or at the downstream end of chamber 3 of FIG. 1A.

For large industrial and utility boilers, the appropriate region for fuel rich, staged, reburn combustion is in the upper regions of the radiant section of the boiler that has its primary combustion zone near the bottom of the boiler. As noted in the discussion of the prior art, it is desired to produce a fuel rich zone with the reburn fuel that is as thin as possible in the gas flow direction. This can best be accomplished with a flat fan spray pattern that is perpendicular to and intercepts the hot combustion gas flow, downstream of the primary combustion zone. In this case, the air or steam atomized, liquid droplet fuel is discharged through a narrow slit 26 cutting the entire outer hemispherical dome of the water-air mixing chamber of FIG. 2D. This produces a flat, fan like spray pattern that widens to almost 180° several feet downstream of the injector outlet by assuring that the width of the slit extends into the air-water mixing chamber. This is not the case for the spray nozzles supplied by Spraying Systems Co. As noted, the SU 23 diverges to about 60° at a distance of 15 inches from the injector outlet because the cut 26 of FIG. 2D contracts sharply toward the inner air-water mixing chamber. For larger injectors that are suitable for large boilers, such as Spraying System's flat fan spray Catalog Number SU85, the included divergence angle is about 120° within 27 inches from the injector outlet. This has been found acceptable in Zauderer's previous SNCR NOx control invention (U.S. Pat. No. 6,048,510) that used this spray injector in several utility boilers. The SU85 is placed in a ½JBC body having ½ inch NPT pipe thread rear inlets for the water and air flows. Another nozzle setup, SU89, has the same water injector, but replaces the wide-angle flat spray outlet orifice, with the same six hole circumferential design as in the smaller SU29 nozzle. For these larger droplet injectors the spray pattern is sharply different for the two injectors compared to the smaller ones discussed above. At 44 psig air and 35 psig water pressures in both nozzles, the spray pattern for the round pattern SU89 nozzle is a cone that is 29 inches in diameter at 27 inches from the nozzle exit (equal to about a 60° included angle), while for the presently preferred SU85 nozzle, it is 85 inches wide (equal to about 120° included angle, or double that of the SU23 flat plane nozzle). The length of the spray with the SU85 in ambient air tests by Spraying Systems was 13 to 20 feet, increasing with air and water pressure. Therefore, to practice this invention in a large utility boilers, the latter nozzle is selected because the flat nozzle spray is injected in a plane perpendicular to the combustion gas flow direction, and intercepts the widest possible gas flow. Droplet size tests by Spraying Systems under ambient air conditions for the SU89 showed mean droplet size increasing from 120 microns at 40 psig air and 30 psig water, to 500 microns at 30 psig air and 30 psig water. As per the following discussion in connection with Table 1, this mean-droplet size is appropriate for large utility boilers.

It is noted that the Spraying System's air cap that produces the above spray patterns is only cut open to 180° on the external outlet side of the hemispherical dome. On the internal side of the dome the opening is less than 180°. By further opening of the internal outlet 26 of FIG. 2D it should be possible to approach the 180° wide flat fan spray. For the present invention, it is preferred to widen the internal air cap outlet opening to as close as 180° as possible to achieve the widest flat spray.

Spraying Systems has also measured the accumulated volume percentage for these droplets. For example, the nozzle SU82 has the same water flow design as SU85, but has the single outlet 211 of FIG. 2B. It produces droplets having 50% of the accumulated droplet volume between the mean droplet diameter and the maximum diameter, which is 145% greater than the mean diameter. The droplets below the mean size have a wider size distribution, decreasing to as much as one third of the mean size. Furthermore, only 10% of the accumulated droplet volume lies between 33% and 58% of the mean size. These droplet characteristics are of some importance in practicing this invention. This means that the injector must be placed at the outer boundary of the appropriate gas temperature region being converted to fuel rich conditions, and the injector head must be moved nearer and further into the furnace as this temperature changes due to load changes in the boiler. Otherwise, placing the injector nearer to the cooler boiler wall will cause the smaller droplets to vaporize and the coal particles to release insufficient heat to reach a gas temperature at which fuel rich NOx reduction takes place.

Field tests by Zauderer (U.S. Pat. No. 6,508,410) showed somewhat higher, (about 20% higher), water flow rates than the published values by Spraying Systems for specific air and water pressures. Consequently, the mean particle diameters must be measured for each specific application by commercial instruments designed for this purpose. The droplet sizes are measurable by a method described in U.S. Pat. No. 4,719,092 to Bowers, which teachings are incorporated here by reference. Alternatively, and preferably, one can adjust the air and aqueous mixture pressures by trial and error to achieve the droplet size that yield the highest NOx reductions.

For the purposes of this invention, from the volumetric airflow and air pressure at the mixing chamber outlet of the atomizing injector, the initial velocity and momentum of the mean water droplet can be computed, with the mean particle diameter obtained by measurement or from nozzle manufacturer's data. Using the aerodynamic drag for the particles, the initial force on the particle is computed. From Newton's Second Law of Motion, one can approximately obtain the time required for the particle to lose a fraction of its initial momentum, for example 10%, while ignoring mass loss due to vaporization. With the SU85 nozzle at 40 psig air pressure and 30 psig water pressure, 3 gallons per minute water flow were obtained at 7 acfm air flow, where "acfm" is the air flow in cubic feet per minute (cfm) at the actual (a) air temperature and pressure. This yields an estimated outlet velocity for the air and water droplets of 176 ft/sec, which is almost twice the value given for these pressures in the Spraying Systems Co. catalog. Table 1 shows the computed time for boiling (i.e. vaporization) of water droplets ranging from 10 microns to 1,000 microns; the time for these droplets to lose 10% of their injection momentum in the hot combustion zone, without consideration of mass loss due to boiling; the distance the particle will travel in the hot gas while losing 10% momentum; and the ratio of 10% momentum loss time over boiling time.

The table shows several key results needed to practice this invention.

1) Droplets under 100 microns are unsuitable for large utility boiler because they penetrate less than 2 feet, while losing much of their liquid mass to vaporization. When including the mass loss due to vaporization the depth of penetration will be even less. Since a 100 MW boiler is 20 to 40 feet wide, depending on design, numerous injectors would be required and the injector heads would have to be placed deep inside the furnace chamber, and the injector heads would have to be placed at various distances from the inner furnace wall to deep inside the furnace chamber to obtain complete coverage of the area being treated.

2) Particles in the size range of about 400 microns to less than 1000 microns are suitable for large boilers of 100 MW and above. In this size range, depth of penetration is many feet with moderate mass loss due to boiling. Note that the large mass loss at 1,000 microns is due to the dominant contribution of the radiative heat transfer term. However, due to the transparency of water, this effect is most probably overestimated.

A more rigorous analysis of the water droplet behavior can be made, which would include the mass loss due to boiling. However, since the particle mean diameter can be readily changed by changing air and water delivery pressure, the optimum particle size can be best determined by testing in the boiler of interest.

Note that width and depth of penetration is more important in large utility boilers because the nozzles can economically only be inserted in existing openings in the boiler wall. This means that the droplet spray patterns must be transverse to the gas flow direction, and it is the reason why a fan spray pattern is disclosed as the most effective means of intercepting as much of the gas flow as possible. Consequently, the preferred practice of this invention in large boilers is to insert several fan spray injectors transverse to the gas flow direction, with a number sufficient to cover the proper temperature zone cross-section for conversion to slightly fuel rich conditions and reduce the NO concentration. As noted for 100 MW boilers and somewhat larger, the ½JBC injector assembly with Spraying System's Catalog Number SU85 flat fan spray injector is preferred, while for even larger, multi-100 MW boilers, the 1JBC injector assembly with the flat fan spray pattern injector SU155 is preferred.

Table 1 also indicates that the water droplet size range of 10 to 10,000 microns as proposed in U.S. Pat. No. 4,719,092, among others, is much too wide to teach proper injection in boilers. The lower size is too small to penetrate much beyond the injector, while the upper size is much too large for even very large utility boilers. In Table 1, the following headings are used: the water droplet boiling time,(T boil), the time for particle loss of 10% of injection momentum, (T mom), the droplet penetration distance for this 10% momentum loss as applied to various indicated sizes of water droplets. Also shown is the relative time for 10% momentum loss to total boiling time of the particle (Tmom)/Tboil),

TABLE 1

| Particle Dia , (microns) | T boil, (sec) | T mom, 10% loss, (sec) | Distance for 10% mom.loss, (ft) | (Tmom)/Tboil), (%) |
| --- | --- | --- | --- | --- |
| 10 | 2.94 E-4 | 2.41 E-4 | 4.24 E-20 | 82 |
| 50 | 7.20 E-3 | 3.02 E-3 | 5.32 E-1 | 42 |
| 100 | 2.85 E-2 | 1.27 E-2 | 2.24 | 45 |
| 400 | 4.00 E-2 | 8.50 E-3 | 1.5 | 21 |
| 1000 | 9.20 E-2 | 6.03 E-2 | 10.6 | 66 |

Table 1 also shows how to practice this invention in different size boilers. In small industrial boilers, particles below 100 microns will penetrate throughout the reburn zone. Therefore, as already noted above, one can use either a flat fan or a conical flame pattern injector 14 inserted into chamber 5 or injector 146 inserted at the downstream end of chamber 3 in FIG. 1 or injector 141 inserted in chamber 5 with the injector head facing the gas leaving the combustor exit 4 and producing a conical spray pattern 144 in the upstream direction. In all cases droplets below 100 microns would penetrate through the 2.5-foot diameter chamber 3, or the 17-inch diameter exhaust from exit nozzle 4.

In the process of reducing this invention to practice in the 20 MMBtu/hour combustor of FIG. 1, the reburn tests were conducted with oil injector 146 to produce a conical flame 147 at the downstream end of combustor chamber 3. As discussed below, these tests with oil yielded measured NOx reductions as high as 84% in the boiler's stack, which is the largest reduction obtained in the many dozens of reburn tests in the combustor.

On the other hand, in large industrial and utility, where access ports into the boiler are limited and the volume of gas that must be treated is large, a wide, flat, fan spray pattern 39 indicated in FIGS. 3A–B using the injector head having the flat spray outlet 26 in FIG. 2D, combined with larger droplets and a wide particle size distribution is very much preferred. One factor must be considered when injecting droplets in a fan pattern transverse to the gas flow namely the gas flow will drive the droplets into the direction of the gas flow. Since the combustion gas velocity in the boiler is substantially lower than the droplet inlet velocity, a slight orientation of the injector in the direction of the gas flow will partly compensate for this effect.

As noted above, the gas temperature is the dominant parameter in determining the rate at which NO is converted to $N_2$ under fuel rich conditions. It was also noted above temperatures of about 2500° F. will result in NO conversion in about one-tenth of a second. In small boilers, such as the 17,500 lb/hour boiler discussed in connection with FIG. 1, a single injector at the inner wall of zone 5 in FIG. 1 that has the desired initial combustion gas temperature is sufficient to add reburn fuel that changes the local fuel lean conditions to fuel rich conditions. However, in large boilers, such as a 100 MW boiler, which have upper furnace cross-sections of about 20 feet×20 feet, the combustion gas temperature within several feet of the inner furnace wall of the boiler is substantially lower than in the central core. Therefore, to practice the present invention, it is necessary to insert the reburn fuel injector nozzle into the outer edge of a zone of gas temperature of about 2000° F. to 2500° F., preferably nearer to the upper range. For large utility boilers, such as boiler 31 in FIG. 3, this region 36 is at the upper radiant furnace above the main burner 32 and its flame pattern 33, and below the slag screen 34 and superheater panels 35, depending on the boiler design and operating conditions. The appropriate temperature zone changes as the load on the boiler changes. Therefore, the injector assemblies 312 are inserted preferably through existing access ports to the edge of the appropriate gas temperature zone 36 to produce a flat reburn flame 39. The use of a flat plane flame results in very efficient use of the reburn fuel as the gas being treated flows upward through this flame sheet and the NO is converted to $N_2$ in a minimum vertical distance only several feet in height. The injector can be moved further in or further out as the outer edge of zone 36 changes with operating conditions.

In contrast, the use of a conventional gas or pulverized coal burner, as used in prior art, will produce an elongated conical flame that will require extensive turbulent mixing to produce the proper fuel rich zone in the upper furnace. Another disadvantage of the prior art of conventional flame patterns is that the burners initiate the flame at the wall where the lower gas temperature requires more heat input to reach a gas temperature at which the NO conversion reaction is rapid. As a result this reburn volume 36 in FIG. 3 with prior art gas or coal burners would be very much larger than with a flat flame sheet that is removed from the boiler wall. The prior art reburn would require much more reburn fuel than with the flat flame sheet used in the present invention.

The flat flame sheet can be produced with an air atomized injector, such as supplied by the Spraying Systems Co. Depending on the fuel flow rate, an injector assembly ¼ JBC or ½ JBC or 1 JBC can be used to which the attachment of either a ¼ inch pipe or ½ inch pipe or 1 inch pipe, respectively, for the reburn fuel pipe 23 and the compressed atomizing air pipe 22 of this injector assembly 21, as shown in FIGS. 2A and E. These two parallel pipes 22, 23 are inserted several inches into region 5 in FIG. 1A for small industrial or commercial boilers, or up to a depth of over several feet into large boiler's gas stream region 36, as indicated below in FIGS. 3A–B. Since the injector 21 is inserted into a gas at up to 2500° F. temperature, it is cooled as described in the discussion relating to FIG. 2 above.

A further advantage of the external water cooling approach disclosed is that in the event of electric power cutoff to the pumps that feed the aqueous solution or mixture into the injector, cooling flow can be maintained by a simple gravity feed which will prevent warping or damage to either the liquid or air feed pipes.

An alternative to air atomized droplet injectors is to use hydraulic injectors. The issues related to use of the latter were discussed above. While it has disadvantages, as noted above, a major benefit is lower cost of the injectors and the elimination of the compressed air system with its attendant high power consumption. Therefore, hydraulic injectors were evaluated for the present reburn method of NOx control. Referring to FIG. 2, the outlet orifices for the hydraulic injectors can have the same outlet openings as shown in FIGS. 2B–D. The air pipe and outer cooling jacket as shown in FIG. 2A and 2E, are eliminated. Hydraulic atomizers are supplied by McMaster-Carr Company, New Brunswick N.J., and Spraying Systems Company, Wheaton, Ill., among others. As noted above the Spraying Systems' Model SU85 produces a flat fan spray at 36 psig air pressure and 35 psig water pressure resulting in a flow rate of 3 gallons per minute and droplets in the 100's of microns in diameter. A McMaster-Carr Catalog Number 3404K34 stainless steel hydraulic injector yields a 120° flat fan spray flow rate of 3 gallons per minute (gpm) at 40 psig. At 100 psig the flow rate increases to 4.74 gpm. However, the dimensions of the droplet fan patterns are substantially smaller that an air atomized nozzle and the droplets size from visual observations is much greater, possibly as much as a factor of 10, which could be too large for effective coverage of the treated gas zone. A McMaster-Carr Catalog Number 32885K57 stainless steel hydraulic injector yields the same flow rates and droplet sizes at the same pressures as the 3404K43 but in a fill cone spray pattern. According to the Spraying Systems catalog, an air atomized injector yields a Volume Mean Diameter, VMD, spray of 200 microns at 40 psig at a 8 gpm flow rate, while the VMD increases to only 400 microns at 100 psig and 12 gpm. On the other hand, a flat fan hydraulic spray injector has a VMD of 2500 microns at 10 gpm and 40 psig, and a VMD of 1400 microns at 15.8 gpm and 100 psig. Since the desired droplet size range for practicing the present invention is in the 10 to 1000 micron range, it would be necessary to significantly increase the number of injectors as well as the feed pressure in order to obtain the same droplet range and flow rates as with air atomized injectors. To reduce the particle diameter in a hydraulic injector, one can use multiple smaller capacity injectors instead of a single total equivalent capacity air atomized injector. For example, a Spraying System flat fan hydraulic injector at 100 psig has a VMD of 190 microns and 0.05 gpm, and 1400 microns at 5 gpm. Nevertheless, there may be conditions, such as lack of available plant compressed air, or cost considerations (a stainless steel hydraulic injector costs as much as 20 times less than an air atomized injector at the same rating) that may favor use of hydraulic injectors.

The above discussion on droplet injection applies primarily to aqueous droplets containing dispersed solid fuel particles, namely coal or char from coal or biomass. However, based on the extensive testing performed in the 20 MMBtu/hour combustor of FIG. 1, excellent NOx reduction results were obtained with No.2 fuel oil. While this oil is considerably more costly than coal, one could also use heavy No.6 oil having either low sulfur content, or the $SO_2$ formed could be removed by a stack scrubber or by injection of lime. Since the oil is combustible, its size would decrease at a faster rate than a water droplet. Therefore, the droplets must be larger than aqueous droplets to penetrate deeply into the interior a large furnace, which favors the use of hydraulic injectors.

Several dozen tests have been performed, each of up to several hours duration, in the 17,500 pound per hour combustor-boiler, shown schematically in FIG. 1, to determine the performance of these hydraulic and air atomized injectors for $NO_x$ control by staged reburn combustion. In the initial test series, air-atomized oil at a rate of 5.6 and 7 MMBtu/hour plus 1 MMBtu/hr of propane was used as the primary fuel in the air-cooled cyclone combustion chamber 3 in FIG. 1. The oil and gas burners were located at the closed upstream end of the combustion chamber 3. Since the measured $NO_x$ levels were in the range of 0.09 to 0.17 lb/MMBtu, an aqueous solution of 14% to 15% ammonia was injected near the oil and propane flame, using either a hydraulic or air atomized injector. This increased the initial $NO_x$ level at the reburn zone 5 to between about 0.27 to 0.56 lb/MMBtu. This is in the lower range of $NO_x$ emission from coal-fired combustors. $NO_x$ levels were measured with a probe inserted through the wall of zone 5 and at the boiler stack outlet 17.

The nominal stoichiometric ratios, SR, in the air-cooled combustor, computed from the measured combustion air flows with pitot tubes, were in the range 1.3 to 1.59 in reburn zone 5, and identified as SR1, and 1.92 to 2.42 in the stack 17, identified as SR2. The $NO_x$ concentrations were analyzed by using the measured oxygen concentration at two $NO_x$, CO, and $O_2$ gas sampling locations, in chamber 5 and 17 in the stack outlet of the boiler 1 in FIG. 1. The actual SR2 deduced from the oxygen concentration at the stack 17 generally averaged 80% of the values computed from the air and fuel flows. The combustor's air-cooling requirements at these low heat inputs required very lean operation, i.e. high excess air. The oil reburn fuel was introduced with a hydraulic oil atomizer or a compressed air atomizer, with the injector head placed immediately downstream, and slightly above the top of the exit nozzle 4 outlet of the combustor. The amount of reburn fuel oil injected into zone 5 ranged from 22%, i.e. 1.7 MMBtu/hr to 32%, 2.5 MMBtu/hr, of the primary fuel heat input. This reburn fuel range lowered the computed SR1 in zone 5 to 0.99 from 1.3 without reburn fuel, and to 1.24 from 1.59 without reburn fuel. Additional air for final combustion was supplied by the wall cooling pipes that surrounded the outlet of zone 5 and exited at location 11 at the outlet plane of zone 5 into the boiler.

The gas composition in the stack 17 consists of the air flow introduced into combustor 3, the air flow added through pipes 11 into the boiler, as well as any infiltration air through leaks in the boiler wall 12 and into chamber 5 both of which were the slightly below atmospheric pressure, about 1 inch of water pressure, caused by the induced draft of a stack fan. The gas composition measured by inserting a sampling tube in the reburn zone 5 consists only of the airflow into the combustor zone 3 and any minor air infiltration into chamber 5. Furthermore, the gas composition changed substantially as the gas probe is inserted away from the wall into chamber 5. Exit nozzle 4 was 17 inches in diameter, while chamber 5 is approximate 30 by 30 inches in cross-section by 2 feet long. Within a few inches from the wall of chamber 5, the measured oxygen concentration was consistent with the overall values of SR1 deduced from the measured airflows, namely 1.3 to 1.59 for the reburn tests. However, as the probe was inserted into zone 5 to intercept the outer edge of a cylinder that extends from exit nozzle 4, the oxygen concentration decreased sharply. Therefore, despite the fact that the addition of the reburn fuel to zone 5 reduced the SR1 deduced from the air flows at that location to the range of 0.99 to 1.3, which was still fuel lean, the actual stoichiometry in the central core into which the reburn fuel was injected was fuel rich, with an outer gas annulus of excess oxygen content.

The gas temperature in zone 5 measured for a 6.6 MMBtu/hr heat input was about 1700° F., while at 7.3 MMBtu/hr it was 1800° F. From this one estimates that at a heat input of 8 MMBtu/hour, the gas temperature would be about 1900° F. As noted above, these temperatures are in a range where conversion rate of NO to $N_2$ under fuel rich conditions is in the order of seconds, which is too slow for the small dimension of zone 5 in FIG. 1. Although not measured, the addition of the reburn fuel ranging from 1.7 to 2.5 MMBtu/hr most probably increased this temperature to the 2500° F. range in the central gas core of zone 5 at which temperature NO to $N_2$ conversion occurs in about 0.1 seconds. This was qualitatively verified in one test at a heat input of 6.6 MMBtu/hr and an SR1 of 1.57. Introducing 1.7 MMBtu/hr into zone 5 would theoretically increase the gas temperature by about 780° F. to 2480° F., and the measured NOx at the stack was reduced by 43%. Increasing the reburn fuel rate to 2.5 MMBtu/hr would result in a gas temperature increase of about 1150° F., which yields a computed gas temperature of 2849° F. Here thermal NOx will form immediately downstream of the reburn zone when added oxygen laden air mixes with the central gas core. This would account for the reduced NOx reduction of 39% for this case. The third condition in this test was to increase the primary heat input to 8 MMBtu/hr where the estimated initial temperature in zone 5 would be 1900° F. When adding 2.5 MMBtu/hr of reburn fuel to zone 5, which would increase the computed gas temperature to about 3050° F., the $NO_x$ reduction was only 35%. This pattern of lesser reduction is consistent with the increase in thermal NOx as the gas temperature approaches 3000° F. Additional evidence that the central core of the combustion gas flowing out of nozzle 4 into zone 5 became fuel rich with the addition of the reburn fuel was noted in one test at an initial heat input of 6.6 MMBtu/hour where SR1 was computed from the airflow at 1.64. The addition of 2.1 MMBtu of reburn fuel oil reduced the overall SR1 in zone 5 to 1.24, i.e. still fuel lean. The gas sampling probe inserted toward the central core of zone 5 yielded no measurable oxygen and a $NO_x$ reduction of 91% from 0.4 lb/MMBtu, without reburn, to 0.04 lb MMBtu, with reburn. However, the final NOx reduction at the stack was only 59%, part of which was due to the injection of urea into the boiler 12 through its rear wall. This indicates that $NO_x$ from the gas stream that bypassed the central core in zone 5 as well as final combustion of the fuel rich gas in zone 5 increased the final $NO_x$ level. Note, that the CO measured in the core of zone 5 was higher than the CO sensor limit of 2000 parts per million, which is another proof of the fuel rich gas condition at that location.

In general, the $NO_x$ reduction measured at the stack due to reburn with fuel oil in this series of tests in zone 5 of FIG. 1 ranged from 26% to 44%.

The majority of reburn tests with oil were performed with air atomization. Only a few tests were with hydraulic atomization because the level of reburn needed was not known initially, and hydraulic nozzles must be selected for operation in their design range. For example, the McMaster-Carr Company's hydraulic nozzle Catalog No. 32885K55, has a capacity with water of 1.08 gpm at 20 psig, and 2.31 gpm at 100 psig, for a turn down ratio of about 2. Operation below this range will yield a poorer spray pattern, while operation above this range requires more costly oil pumps. An air-atomized nozzle, on the other hand, allows a very wide turn down ratio because the air pressure controls the droplet size. For example the air-atomized Spraying Systems Company's Model NO. SU82 single outlet injector has a range from 0.58 gpm at 10 psig air and 5 psig water pressures to 3 gpm at 36 psig air and 35 psig water pressure, for a turn down ratio of over 5. Therefore, in reducing the invention to practice, air atomization is preferred because the required reburn oil heat input is not known for certain beforehand. In fact, reburn heat input had to be increased to as much as 30%, which is far above the economically desired 5% to 10%, to obtain significant NOx reductions. This was due to the high excess air conditions in the primary combustion zone. Also, for reburn with slurry fuels, the larger liquid passages in air-atomized injectors are less susceptible to blockage by the solids in the slurry. However, since power plants do not operate with very high turn down ratio, the lower cost hydraulic injectors would be preferred, especially with liquid reburn fuels, such as oil.

The tests with oil for reburn were followed by tests in which wood and rice husk biomass was used as the reburn fuel. Before discussing the biomass reburn tests, results of more recent tests will be discussed in which oil was used as the reburn fuel in the downstream end of the primary combustor chamber 3 of FIG. 1. The air-cooling pipes that surrounded chamber 5 in FIG. 1 were made of low-grade steel and they rapidly oxidized during implementation of the above tests. It was, therefore, necessary to remove the air-cooling pipes that were placed in the upper half wall of chamber 5. This eliminated the use of chamber 5 for reburn because the combustor wall cooling air from these upper wall pipes now discharged air into chamber 5 at location 111 in FIG. 1A. This increased the oxygen concentration in chamber 5 to the point where reburn would have required a major addition of fuel into chamber 5. Consequently, the oil reburn tests were performed with a hydraulic atomized oil injector 146 inserted in the roof of chamber 3 of FIG. 1A.

One goal of these additional oil reburn tests was to change the stoichiometry in the primary combustion zone 3 of FIG. 1 to lower excess air conditions. This was accomplished by reducing the primary fuel heat input into the chamber 3 to between 2 and 3 million Btu/hour. The lower heat input reduced the need for air cooling of the combustor, which was a primary factor in the previous high excess air operation. Also, the lower heat input resulted in confining the excess air combustion zone to the upstream end of chamber 3. Also, with less excess air, hydraulic nozzles could be used for reburn as the reburn fuel input range was reduced. In one typical test, the primary fuel input consisted of 0.57 MMBtu/hour of propane, 0.85 MMBtu/hour of oil, and 1.38 MMBtu/hour of biomass sawdust, for a total primary input of 2.8 MMBtu/hour. An aqueous ammonia solution was injected with the fuel, which increased the NOx concentration to 0.3 lb/MMBtu at the stack. The reburn oil flowed through hydraulic injector 146 to produce a conical flame pattern 147 that was inserted through a port in the roof at the downstream end of combustion chamber 3. The reburn fuel flow rate was 0.24 MMBtu/hour, or 8.5% of the primary heat input. The peak $NO_x$ reduction measured at the stack was reduced to 0.05 lb/MMBtu, equal to 84% reduction. The stoichiometric ratio deduced from an oxygen measurement in chamber 5 of FIG. 1 was 1.3%, compared to 8.2% without reburn, which indicates that reburn was taking place at the downstream end of the combustor. This is a very significant result because it shows that $NO_x$ reduction using reburn can take place inside the primary combustion chamber. This allows efficient combustion of coal under excess air in the upstream end of the combustor, followed by reburn with oil, or even coal. The coal ash from the reburn injection would be removed as slag through opening 41 in the floor of the combustor.

Reburn tests using biomass fuel were performed after completion of the initial oil reburn tests. Initial tests were implemented with rice husks. However due to the 20% ash content of rice husks, which yielded high ash deposits on the boiler floor, sawdust, which is essentially ash free, was used in most subsequent tests. In the initial tests, the rice husks and then the sawdust was air blown through a 1-½ pipe that was inserted through the an opening in the side wall of rectangular chute 41 at the downstream end of combustion chamber 3 in FIG. 1. The biomass flame was a narrow cylinder that impinged on the roof of the combustion chamber. In subsequent tests, a flattened outlet injector 240 as in FIGS. 2F and 2G was attached to the end of the 1½ inch pipe and used to produce a planar flame 149 perpendicular to the gas flow direction.

In one test, the planar injector 240 was inserted as injector 15 to produce a planar flame 143 perpendicular to the gas flow direction in chamber 5 of FIG. 1. With a primary fuel input of 8 MMBtu/hour, the initial SR1 in combustion chambers 3,4 and 5 of FIG. 1 was 1.2, as measured from the oxygen concentration with a probe inserted into chamber 5. This corresponds to the typical excess air conditions used in coal fired power plant boilers. In the stack, SR2, computed from the oxygen measurement was, 2, while SR2 computed from the fuel and airflows was 1.9. The higher SR2 from the $O_2$ was due to air leakage into the boiler 1 of FIG. 1. With the injection of aqueous ammonia with the primary fuel, $NO_x$ increased to between 0.2 to 0.23 lb/MMBtu. With the addition of sawdust as a reburn fuel at a heat input of 3 MMBtu/hour, or 38% of the initial heat input, the NOx level measured in chamber 5 and in the stack 17 of FIG. 1 was minimally reduced. From the $O_2$ measurement, SR1 in chamber 5 was little changed from before the sawdust injection, and SR2 from $O_2$ in the stack was reduced to 1.55 versus a value of 1.3 computed from the fuel and airflows. This indicated that much of the sawdust was not burning, and in fact after the test substantial levels of unburned char were found on the boiler floor immediately downstream of the outlet from chamber 5. This showed that the sawdust was being blown into the boiler where the airflow from pipes 11 rapidly cooled the gas below the ignition temperature of some of the sawdust. When the sawdust feed rate was increased to 4 MMBtu/hr, SR2 from $O_2$ in the stack was 1.26 versus 1.1 computed from the air and fuel flows. In this case the $NO_x$ at the stack was reduced by 26% while at the probe in chamber 5, where the $O_2$ level was now zero, i.e. fuel rich, it was reduced by 74%. This result clearly shows that sawdust injection in chamber 5 is not effective because the sawdust combustion does not fill the gas volume in chamber 5 and also because too much of the sawdust is blown into the colder boiler where it does not burn.

The proof that non-uniformity was a major factor in the poor results with sawdust injection in chamber 5 was obtained in another test when oil was injected at the same location as the sawdust in chamber 5. With oil reburn fuel at 1.4 MMBtu/hr or 16% of the initial heat input, the $NO_x$ reduction at the stack was 20%. Increasing the oil flow to 2.1 MMBtu/hour, or 24% of the primary heat input, increased the total $NO_x$ reduction at the stack to 35%. A further increase to 2.8 MMBtu/hour, or 31% of the initial input, yielded a total reduction at the stack of 45%. Finally, another increase to 3.2 MMBtu/hr, or 35% of the primary heat input, increased the NOx reduction to 70%. The SR2 computed from the $O_2$ measurement at the stack, decreased from 1.75, with no oil reburn, to 1.03 with maximum oil reburn. The better performance with oil is expected because it is more readily dispersed in chamber 5. Thus increasing the oil flow increases the volume of gas subject to reburn. However, even with oil, the dispersion of the flame was not uniform as evidenced by the increase in CO measurement at the stack as the oil flow increased. This suggests that multiple oil injectors should be used to maximize $NO_x$ reduction without commensurate increases in CO.

To assure more uniform reburn with sawdust and to assure more time for sawdust combustion before the flow enters the colder boiler at the outlet of chamber 5, the sawdust injector 240 of FIG. 2F was inserted as injector 148 in the sidewall of chute 41 on the combustion chamber 3 of FIG. 1. The flat flame 149 was nearly transverse to the gas flow axis. With sawdust reburn injection of 3 MMBtu/hr, or 35% of the primary heat input of 8.5 MMBtu/hour, the $NO_x$ reduction at the stack was 32%. Without reburn, the SR1 computed from the fuel and airflows into the combustor 3 was 1.3, i.e. 30% excess air. SR2 at the stack, as computed from the $O_2$ measurement, decreased from 1.9, i.e. very high excess air, without reburn, to 1.2 with reburn. For the same level of reburn, the $NO_x$ level at the probe in chamber 5 was reduced by 89%, and the $O_2$ reading was zero, indicating fuel rich conditions. Note, however, that the probe tip was at the outer radius of the exit nozzle 4, where it intercepted the gas flow exiting the combustor chamber 3. Nearer to the wall the oxygen level was generally higher. Increasing the sawdust heat input to 3.6 MMBtu/hour, or 42% of primary heat input, did not further reduce the NOx level in chamber 5 or the stack 17. A further increase of the sawdust input to 4.2 MMBtu/hour, or 49% of the initial heat input, reduced $NO_x$ at the stack by 65%, and SR2 to 1.02, i.e. there was only about 1% oxygen in the stack gas stream. This caused a sharp increase in the CO level in the stack, which is a strong indication that even with reburn in the downstream end of the combustion chamber 3, sufficient non-uniformities remain to cause uneven reburn combustion. However, this may not be a problem in large boilers where the combustion gases remain at high temperature at substantial distances downstream of the reburn zone.

One can draw the following conclusions from the above reburn tests in the 17,500 lb/hour boiler in order to practice this invention:

1) Droplet injection of a liquid fuel inserted into a hot gas zone is effective for $NO_x$ control by reburn combustion.
2) After the amounts of reburn heat input needed for effective $NO_x$ reduction has been determined, it is preferable to use lower cost, hydraulic fuel injectors instead of air-atomized liquid injectors. This applies even to slurry fuels, provided the hydraulic injector passages are large enough to prevent blockage by the fuel.
3) It is important to operate the primary combustion zone with a minimum of excess air, preferably less than 15% excess air, consistent with efficient combustion. High levels of excess air, as existed in the initial 17,500 lb/hour boiler tests, required high levels of reburn fuel, which is costly, and increases the probability of high carbon monoxide emissions. In the later oil reburn tests at low primary fuel heat inputs, over 80% $NO_x$ reduction was measured at less than 10% reburn oil heat input.
4) The tests showed that creating a local fuel rich reburn zone within a larger combustion gas zone that is at excess air can yield substantial $NO_x$ reductions. This is a very important result because it indicates that this technique can be used in large utility boiler to effect localized $NO_x$ reductions. Final combustion takes place downstream of the reburn zone when gas density gradients cause the fuel rich gases to mix with combustion gases that were outside the reburn zone and contain excess oxygen. This process eliminates the need for costly additional air ducting into the boiler's reburn region to implement final combustion.
5) To maximize $NO_x$ reduction and minimize carbon monoxide formation one should use multiple reburn fuel injectors to achieve uniform combustion throughout the reburn zone. This was demonstrated from the improved $NO_x$ reduction when the sawdust was injected with a flat fan outlet as opposed to a circular pipe outlet. In addition, the reburn zone should be located sufficiently upstream of a zone of rapidly decreasing temperatures. This was proven by the lower $NO_x$ reduction when the biomass was injected in chamber 5 of FIG. 1, which was immediately upstream of a rapid drop in gas temperature, as opposed to the higher $NO_x$ reduction with injection further upstream in combustion chamber 3.
6) The high $NO_x$ reduction measured in the reburn test at the downstream end of the primary combustion chamber shows that a long combustion chamber can be used to achieve low $NO_x$ with difficult to burn fuels, such as coal, heavy oil, biomass, which require excess air conditions in the primary combustion zone for efficient combustion.

The above discussion shows how to practice this invention in small combustion systems. The following discussion shows how this reburn method can be practiced in large boilers:

Referring to FIGS. 3A and 3B for large utility scale boilers, the boiler 31 has a furnace wall 313, coal burners 32, a primary flame zone 33, convective tube banks 35, a zone 36 where in the absence of reburn fuel, the effluent gas temperature is between 2000° F. to 2500° F. The reburn fuel injectors 312, of designs shown in FIG. 2D for liquid fuels and slurries, and FIG. 2F and FIG. 2G for dry solid fuels, are inserted, preferably through existing access ports, to produce a flat fan flame sheet 39 at the bottom of region 36. The combustion gas as it flow upward through the flame front changes from fuel lean to fuel rich, which results in conversion of the NO to $N_2$. Region 36 is several feet away from boiler walls 313. Combustion gases, containing excess air, flow upwards from the primary combustion zone 33 and cool to a temperature in the range of 2000° F. to 2500° F. prior to passing though the flame sheet 39, where the excess fuel results in slightly fuel rich conditions in region 36. The gas temperature in region 36 changes somewhat as the boiler operates at various loads and as a result the optimum location for insertion of the injectors changes. A major advantage of using these wide angle, flat plane injectors is that the reaction zone for $NO_x$ reduction can be covered with a minimum number of injectors. Typically there are sufficient access ports in these boilers so that the injectors can be inserted through these existing openings. If instead a large number of reburn fuel injectors were required, as would be the case with conventional gas, liquid, or solid fuel burners, all of which produce focused conical flames, it would be necessary to cut openings in the boiler tube wall and reroute the water-steam tubes, a costly operation.

The injector 312 outlets are placed at the outer edge of zone 36 and they can be moved further away from the wall or nearer to the boiler wall as the temperature zone 36 expands or contracts as the load on the boiler changes. Temperature measurements in large boilers, such as the 100 MW boiler used by Zauderer in a previous $NO_x$ control invention (U.S. Pat. No. 6,048,510) showed that the gas temperature decreases by several hundred degrees Fahrenheit toward the furnace walls. Therefore, in one method of practicing this invention additional reburn fuel injectors 310, producing a flat flame sheet 315, are placed at the boiler wall 313, said injectors have a higher fuel input than injectors 312 in order to heat the gases near the wall to the 2500° F. temperature where the NO to $N_2$ reaction proceeds rapidly. Based on Zauderer's previous $NO_x$ control invention (U.S. Pat. No. 6,048,510), it is estimated that between four and six SU85 flat plane injectors would be needed to cover the entire zone 36 with droplets. Alternatively, a similar number of dry fuel particle injectors that produce a flat plane flame sheet could be used. In smaller boilers, such as a 37 MW boiler, two SU 85 injectors may be adequate.

To complete combustion of the gas that flowed upward from fuel rich zone 36, additional air is inserted through ports 311, which are openings in the upper furnace walls of the boiler, prior to the gas flowing through the slag screen 34 and on to the superheater platens 35. Note that these placements are not to scale relative to each other. The final combustion air to openings 311 can be drawn from the air ducts that provide the combustion air to the main burners 32. Since the boilers will not have large openings in the upper furnace region, installing large openings through the upper furnace can be costly. It is therefore important to minimize the amount of reburn fuel, which would minimize the amount of final combustion air needed. This argues for minimizing the excess air in the primary combustion zone 33. Even if low $NO_x$ burners that operate at fuel rich conditions are used in burners 32, the additional air introduced above these burners should be minimized. The second step to minimize final combustion air is disclosed by the present invention, namely the use of a flame sheet to reburn the gas in the 2500° F. temperature range where the NO reduction reaction takes place in a fraction of one second.

To estimate the size of the opening in the boiler wall needed for the final combustion air, assume that the reburn stoichiometric ratio is 95% and the final combustion stoichiometry is 110%. For a 100 MWe power plant boiler with a 10,000 Btu/kW-hr heat rate, the 15% of total air that this requires equals approximately 112,500 lb/hr. This equals about 25,000 standard cubic feet/minute. Using a nominal 3,600 feet/minute flow rate would require about a 7 square feet opening 311 in the boiler wall. A typical access port in a large boiler wall is about 1 square foot. If there are insufficient existing ports, either an additional fan can be used to increase the airflow velocity of the final combustion air into the boiler, or failing that, additional openings must be fabricated.

However, the present invention offers an alternative option for reducing, and possibly eliminating, the need for introducing combustion air through the boiler wall 311 for final combustion. As discussed in connection with the test results in the small boiler, it is accomplished by eliminating the reburn fuel injectors 310 at the boiler wall. As a result the combustion gas near the wall will retain the excess air as well as a higher gas density than the hotter, fuel rich gas in region 36. The resultant density and temperature gradients between the cooler gases near the boiler wall and the hotter, lower density gases in the central core 36, will facility mixing of the cooler gases near the wall with those in the central region 36 with the result that combustion of the fuel rich gases is completed. Whether this process is sufficient to yield complete combustion can be readily determined by performing tests on any boiler using the injectors of this invention without the need for first installing additional air access ports 311 in the boiler.

The disadvantage of this approach is that not all the gas flowing upward in the boiler is converted to fuel rich conditions for NOx reduction. The reduction will be approximately in proportion to the cross-sectional area of region 36 to that of the area between the four walls. Using the NO to $N_2$ conversion reaction rates at about 2500° F., one finds that 90% of the NO is converted within 0.1 seconds. Therefore, if the base of region 36 is about 50% of the total boiler cross-section, then the total NO reduction of NO in the central reburn region would result in a maximum overall 50% reduction from staged reburn combustion. Additional $NO_x$ reductions of at least 50% could be implemented upstream of region 36 in the primary burner region 33 by low $NO_x$ burners, and a further reduction of up to 40% could be implemented downstream of region 36 by Selective Non-Catalytic NOx Reduction as disclosed by Zauderer (U.S. Pat. No. 6,048,51 0). Therefore, a cumulative $NO_x$ reduction of over 87% could be achieved by combining these three NOx reduction processes. For example, beginning with uncontrolled $NO_x$ levels of 1 lb/MMBtu, the final NOx levels would be 0.125 lb/MMBtu.

For multi-100 MW boilers, the placement of the droplet injectors would be similar to those shown in FIG. 3, except that Spraying Systems' larger, one-inch pipe 1 JBC assembly and SU155 spray setup would be used.

Note that in the description on how to practice the present invention repeated reference has been made to spray injectors manufactured by the Spraying Systems Company. This documentation has been used because several of these injectors were used in developing the design for practicing this invention. However, it is to be noted that the critical elements needed to implement this invention, namely the spray pattern, the wide droplet size distribution and size range, and the design of the cooling method for the injectors placed in the hot gas stream, can be practiced with any injector design that will produce the desired results.

The preferred use of a liquid fuel for practicing this invention would suggest the use of fuel oil as the first choice. However, due to the high cost of fuel oil relative to coal, it would be preferable to use coal-water slurry as the liquid fuel. As noted above, this slurry is prepared at the power plant at a rate equal to the reburn fuel feed rate, with only several hours of capacity of dry coal storage. Referring to FIG. 3C, for a power plant operating with pulverized coal fuel, the pulverized coal output from the mills 39 is divided into two streams, one 320 to feed coal burners 32 in FIG. 3A, and the other stream 321 carries the coal for the slurry into a storage bin 330 of sufficient capacity for several hours of reburn operation. The coal transport air is removed from this bin with a baghouse 331 that separates any entrained coal dust. The stored coal is discharged through a rotary valve 332 into an eductor 333, whose motive air 334 is supplied by blower 335, at a rate equal to the reburn fuel feed rate.

There are two options for using this coal stream 337 for reburn operation.

One option is to feed the coal directly into burners 310 and 312 in boiler 31 of FIGS. 3A and B. In this case, as shown in FIGS. 2F and 2G, a flattened, elliptical flame 39 and 315 would result by using a coal burner 240 having a flattened elliptical outlet 242. While this approach would be simpler and less costly than the option of preparing coal-water slurry for burners 310 and 312, it must be verified by test that this will result in a flat flame sheet that is large enough to cover the bottom of region 36 in the boiler. The reason being that conventional pulverized coal burners 32 in FIG. 3A utilize fine coal with 70% to 80% passing through a 200 mesh, or 74 microns. These fine particles will be entrained by the upward flowing gas and they will burn primarily near the burner outlet. The experience with this injector in the combustor of FIG. 1 shows that the flame jet will project transverse to the combustion gas flow. This suggests that a high velocity air stream can propel the particles deep into region 36 away from the burner outlet. In any case this procedure should be tested because it is simple to implement by using one or more injectors inserted through existing ports in a large boiler.

Dry pulverized coal was used in one prior-art reburn $NO_x$ control project, (Report No. DOE-FE-0387, March 1999), where 29% to 33% of the total coal fuel input to a 100 MWe boiler was required for reburn fuel. That boiler had primary cyclone combustors that used crushed coal, which typically operate at higher excess air levels than pulverized coal boiler, and would require more reburn fuel to achieve fuel rich conditions. The high quantities of reburn fuel are indicative of the need for more reburn fuel when operating with dry pulverized coal burners. However, no information was provided on the design of the coal injectors or the flame pattern.

Greater reburn flame uniformity could be achieved by inserting the various burners 312 in FIGS. 3A and 3B to different depths into region 36. The dry pulverized coal burners 240 in FIGS. 2F and 2G that are inserted into the furnace would be enclosed with water or air-cooled pipes similar to those pipe 28 or 29 that enclose the slurry injectors in FIG. 2A. While the use of dry pulverized coal for reburn firing as disclosed in this invention allows this option to be practiced, it is less desirable than coal-water slurry firing because dispersing the pulverized coal particles in water droplets of varying size provides better control of the flame pattern than injecting the same small coal particles into the combustion gas.

Figure 4:
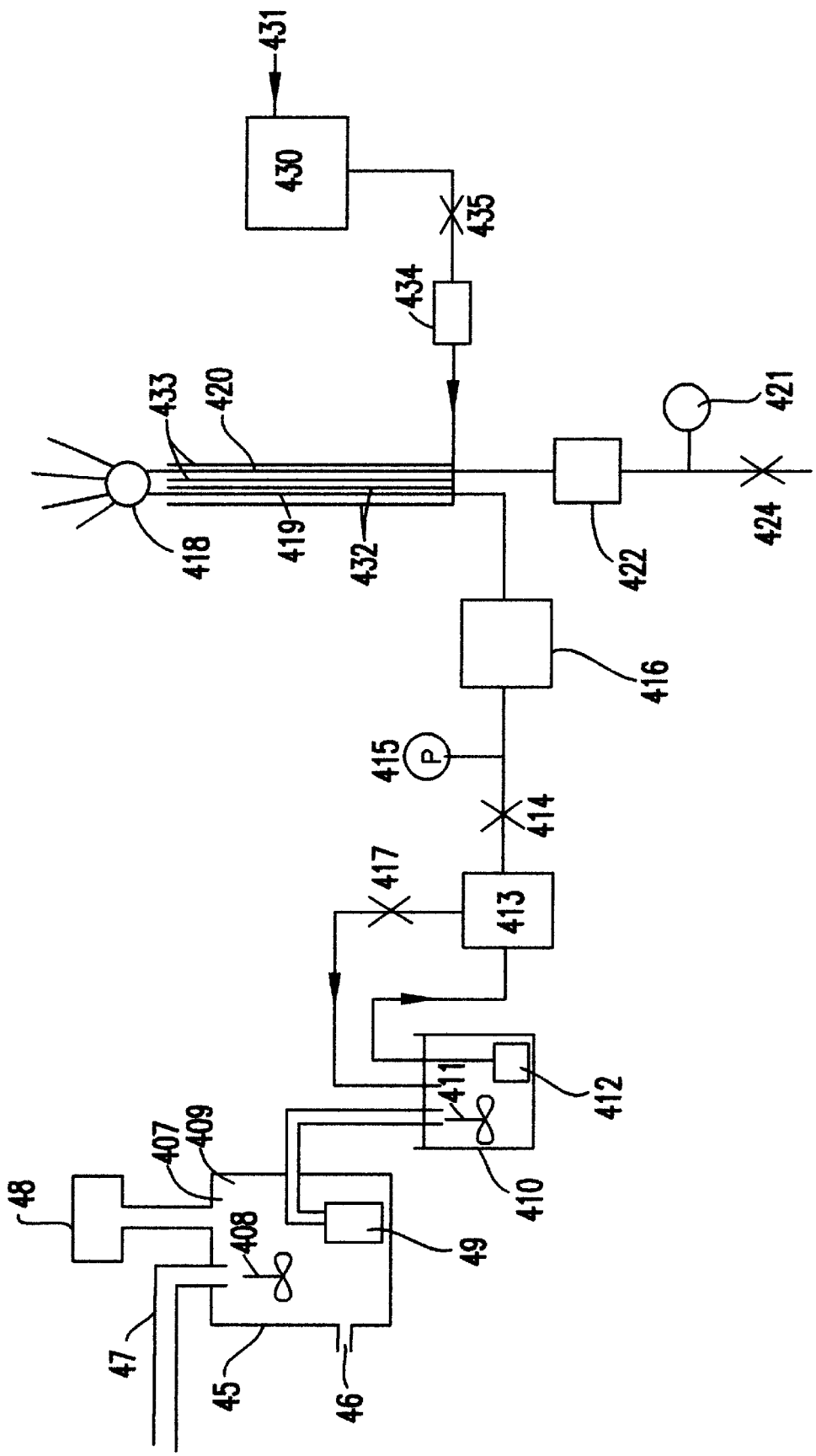
FIG. 4 shows a schematic drawing of one method for using part of the pulverized coal that is removed from the primary coal pulverizers system and mixing said coal in a liquid feed tank to produce a coal-water or coal-oil slurry, and feeding said slurry to the droplet injectors.

Therefore, the preferred option for the pulverized coal stream 337 in FIG. 3C is to convey it through pipe 47 in FIG. 4 to a coal-water mixing tank 45. The coal is mixed with water 46, preferably to a concentration of less than 30% in order to minimize or eliminate the surfactants and stabilizers that help keep the coal particles in suspension as the slurry is pumped to the fuel injectors. However, if necessary, these latter chemical compounds can be added to the mixing tank if coal particle concentrations up to 50% by weight are desired to minimize water evaporation losses. A mixer paddle 408 in tank 45 disperses the coal particles in the water. In addition, a surfactant 409 and a stabilizer 407 can be added to tank 45 to maintain the pulverized coal in suspension. The concentration of the solids in the water is determined by the droplet physics in the boiler as described above and by the coal particle combustion rates. For ease of pumping and atomizing, the particle concentration should remain below 30% by weight. This low concentration may also eliminate or minimize the need for a surfactant and stabilizer. However, this may result in too much water injected into the boiler with its attendant gas cooling. In that case higher concentrations of coal up to 50% by weight can be used provided surfactants and stabilizers of less than 1% of the total mixture by weight are added. However, this very high viscosity mixture may yield a too narrow droplet size distribution and result in an insufficiently large planar flame sheet. Also at concentrations above 30%, the much lower cost centrifugal pumps must be replaced with the more costly progressive cavity pumps. Therefore, the optimum coal particle concentration in water will be determined by trial and error in reburn tests for each boiler site.

Again referring to FIG. 4, a vent and baghouse, 48, removes the conveying air brought into the tank by pipe 47. A centrifugal pump or progressive cavity pump, depending on the solids loading, 49 transfers the liquid to another open tank 410. This tank also contains a mixer 411 that operates continuously to maintain the coal particles in suspension. While tank 45 can be on the ground level of the power plant, tank 410 should preferably be at the injection level, high up in the boiler. From this tank 410, an optional sump pump 412, feeds another centrifugal or progressive cavity high-pressure pump 413, whose outlet flow is split. Part of the flow is re-circulated back to tank 410 to assist mechanical stirrer 411 in stirring the liquid in tank 410 and maintain the particles in uniform suspension, while the balance flows to the injectors. Valves 414 and 417 are used to adjust the flow split. One suitable progressive cavity pump is Grainger Model No. 1P898 that will pump about 3 gpm at 30 to 35 psig at 900 rpm pump revolutions, using ⅓ hp. With these positive displacement pumps, the viscosity of the liquid-solid mixture is critical both in determining pump performance and durability. The 900 rpm rate applies to fluids with viscosities between 500 to 1000 centipoises, cp, which is the range for CWS with 50% to 65% solids loading. However, at 30% lime solid loading in water, it has been found that the effective viscosity is only 30 cp. This has allowed the use of conventional single stage centrifugal pumps, and multi stage centrifugal pumps such as the Grainger Model 2PC31, three stage centrifugal pump, rated at 2 hp, 27 gpm at 60 psig.

The above pumping options are listed to demonstrate that the preferred choice of delivering the liquid mixture to the injectors is to a large extent dictated by cost considerations. The price of these pumps varies considerably and a tradeoff between pump type, pump rating, degree of re-circulation, degree of mechanical mixing, pump durability must be made to arrive at the most economic solution.

The liquid is pumped at a pressure, measured by pressure gauge 415, designed to produce the proper droplet sizes in the air atomized 418, injector. For air atomization, this liquid pressure can be in the range of 30 to 40 psig. Compressed air is fed through the air pipe, 420, to the injector 418. Pressure gauges, 415 and 421 for water and air, and flow meters 416 capable of measuring the flow of an opaque liquid, and 422 for air, with valves 414 for water, and 424 for air, are used to adjust the proper flows and pressures. These valves and meters can be readily automated to adjust the flow rates and pressure as $NO_x$ reduction rates are changed.

The flowmeter 416 can be selected from the group of paddlewheel, or ultrasonic doppler flowmeters. These units vary considerably in cost, reliability, and durability in particle-laden liquids. Examples of these meters are Omega Corp's (Stamford, Conn.) FD-603 NI meter and FD-603A ultrasonic doppler probe, or series FP7000 paddle wheel probe with a DFP700 meter instrument.

The aqueous mixture flows through pipe 419, which is parallel to compressed air pipe 420, to the rear end of the injector 418. The injector 418 is inserted through the furnace wall of a boiler into the combustion gas zone of the boiler, as described above. Both the liquid pipe 419 and the compressed air pipe 420 are each surrounded by pipes 432 and 433 through which water flows to cool the pipes 419 and 420. The water to pipes 432 and 433 flows from a water storage tank 430, which is supplied by water pipe 431, at a rate controlled by valve 435 and a flow meter 434. The reason for a tank 430 is to provide gravity fed cooling water to the injector pipes 419 and 420 in case a power failure cuts off cooling water to the injectors. Meter 434 can be a simple variable area flow meter.

Another item necessary to practice this invention is to determine the gas temperature at which injection of the slurry or dry pulverized coal or other reburn fuel takes place. Since the desired temperature is preferably between about 2000° F. and 2500° F., a fiberglass insulated Type K thermocouple can be used. The most accurate method to measure the temperature is to place the bare thermocouple tip inside a ceramic tube with the tip within about one inch from the end. A one-foot long tube was found adequate for this purpose. The ceramic tube was inserted into a long stainless steel pipe that was inserted into the boiler. For insertion for more than 1 minute, a water-cooled jacket was placed around the pipe. For shorter insertion periods, the steel pipe can be inserted un-cooled into the furnace. Measurements with the protruding thermocouple tip and the recessed thermocouple tip in a ceramic tube with gas suction in the latter case, yielded almost identical gas temperatures in the small 17,500 lb/hr steam boiler for values between 1200° F. and 1900° F.

When using Method 4, discussed above, in which the reburn fuel is shredded biomass, the procedure for feeding the fuel is as follows: Referring to FIG. 3C, shredded biomass is blown into storage bin 330, with the motive air removed through baghouse 331. A rotary valve 332 at the bottom of bin 330 meters the biomass into an eductor 333, which conveys the biomass to burners 312 and 310, with said burners having the configuration 240 of FIG. 3C and 242 in FIG. 3G. All the procedures and technical issues related to utilizing dry pulverized coal for reburn by Method 3 apply here. One benefit of utilizing biomass instead of coal for reburn is that it can be used in cyclone combustors that use crushed coal. Biomass fuel is prepared with shredders that are far less costly than coal pulverizers. Another advantage of biomass is that it is a renewable fuel. One disadvantage of biomass is its low bulk density and poor flowing characteristics. As a result, biomass has a tendency to bridge in the bin as it is drawn out of the conical bottom having a nominal 60° half angle, even with a bin vibrator collar around the bottom of the bin. Blasts of high pressure air can be injected near the bottom of the biomass storage bin to break up the bridging. The same blockage problem with rice husk biomass was observed by the inventor at the bottom of inlet cone to an eductor. It was corrected by installing a helical auger, 336 in FIG. 3C, driven by a variable speed DC motor or AC drive with its tip protruding into the bottom outlet of the cone.

The $5^{th}$ reburn method is to use pyrolysis gas derived from crushed coal to fire burners 310 and 312 in FIG. 3A. Here also burner 240 of FIG. 2F with flattened helical outlet 242 of FIG. 2G is used. Implementation of this method in large utility boilers that are fired by crushed coal, slagging cyclone combustor is identical to the detailed description for small boilers in FIG. 1A. The residual char is fed into the cyclone combustors and the pyrolysis gas into the reburn combustors. This method will not be as effective as using a liquid fuel because the flame pattern will be an elongated pear shape and will require more burners than one with liquid fuels that can produce a flame sheet.

Although it is costly, Method 2 using fuel oil introduced with hydraulic injectors is another option for large boilers. This method may be attractive if a supply of lower cost heavy oil is available and if said oil is low in sulfur or if the power plant is fitted with $SO_2$ removing stack scrubbers or if a post combustion $SO_2$ removal system is installed.

In summary, this invention describes how to implement a $NO_x$ reduction process that converts a primary fossil fuel fired, combustion gas stream containing an excess of oxygen into a fuel rich gas by the addition of a fossil fuel in a "reburn" zone in which $NO_x$ is converted to $N_2$. This fuel rich or "reburned" gas then mixes either with externally supplied air or with combustion gases outside the "reburn" zone that contain an excess of oxygen in order to complete combustion of all partially oxidized gases.

The invention identifies suitable reburn fuels, including, in order of preference, coal-water slurries, shredded or ground biomass, heavy oil, light oil, pyrolysis gas, and gas from partially gasified solid fuels.

The invention describes how each of these reburn fuels are to be prepared at the furnace or boiler site being treated for $NO_x$ reduction and how they are to be delivered to the reburn zone in the combustion gas stream inside the furnace or boiler.

The invention describes what injector designs should be used to introduce each of these fuels into the reburn zone for optimum $NO_x$ reduction effectiveness.

Finally, the invention describes the initial combustion conditions and the placement of the injectors that will yield the most effective reduction of $NO_x$ in furnaces and boilers ranging from small commercial and industrial units to large utility power plant units.

Extensive test results are presented and the most important result is the very high $NO_x$ reduction of over 80% that was measured with this process.

I claim:

1. A method for reducing $NO_x$ effluent from a combustion vessel, comprising the steps of:

burning a fossil fuel in a primary combustion zone of a combustion vessel which includes said primary combustion zone, a reburn combustion volume having an initial uniform gas temperature distribution within a temperature range and a final combustion volume, whose final combustion gas temperature is below the range where significant thermal nitrogen oxides form, said fossil fuel burned in said burning step constituting a majority of a fuel input into the combustion vessel and said reburn combustion volume accommodating the balance of the fuel input as a reburn fuel to said combustion vessel, said burning step producing a combustion gas volume that has a stoichiometric ratio greater than 1 (fuel lean) and which is transported from said primary combustion zone to a reburn combustion volume and said final combustion volume before exiting said combustion vessel;

introducing reburn fuel into said combustion gas stream in said reburn combustion volume of said combustion vessel, with said reburn fuel being introduced by one or more varying droplet size injectors or fan shaped dry particle injectors placed at the edges of said combustion gas volume being treated said reburn fuel being selected from the group consisting of pulverized coal, coal-water slurries, coal-oil slurries, shredded or ground biomass, heavy oil, light oil, pyrolysis gas, and gas from partially gasified solid fuels, said reburn fuel converting a portion of said combustion gas stream to a treated gas stream having a stoichiometric ratio less than 1 (fuel rich); and either combining said treated gas stream within said combustion vessel with untreated combustion gas from said combustion gas stream resulting in complete combustion of said treated gas stream in said final combustion zone, or injecting atmospheric air into said combustion vessel said air supplied externally from said combustion vessel at high velocity through existing openings or added openings in said combustion vessel wall, downstream of said treated gas stream in order to complete combustion of said treated gas stream in said final combustion zone, said reburn fuel being introduced in said introducing step into said God combustion gas volume at an initial temperature that is high enough for complete combustion but low enough to prevent the formation of thermal nitrogen oxides in said final combustion zone.

2. The method of claim 1 wherein said temperature ranges from approximately 2000° F. to approximately 2500° F. prior to of the reburn fuel within the combustion gas volume being treated, said gas volume being normally a distance from said combustion vessel walls, said initial gas temperature being high enough to fully oxidize the combustion gas volume treated with the reburn fuel without resulting in a temperature at or near 3000° F. where thermal nitrogen oxides are formed.

3. The method of claim 1 wherein said step of combining the treated gas stream and untreated combustion gas is used in the method and said step of combining is achieved by gas density gradients with said treated gas volume having a lower density than said untreated combustion gas.

4. The method of claim 1 wherein said step of injecting air at high velocities is used in the method and said step of injecting air is achieved by maximum use of existing openings with added openings in a wall of said combustion vessel as needed to assure complete combustion of the treated gas stream.

5. The method of claim 2 wherein said step of introducing reburn fuel is achieved using a plurality of nozzles positioned in said combustion vessel, with the outlets of said nozzles being placed at the outer edges of the combustion gas volume being treated, said plurality of nozzles creating a fuel rich gas volume in said reburn zone of said combustion vessel.

6. The method of claim 5 wherein said nozzles emit droplets of non-uniform size ranging from 10 to 1000 μm in diameter.

7. The method of claim 1 wherein said step of introducing reburn fuel is achieved using at least one nozzle which emits said droplets or dry particles reburn fuel as a flat fan shaped spray.

8. The method of claim 7 wherein said nozzle emits droplets of non-uniform size ranging from 10 to 1000 μm in diameter.

9. The method of claim 1 further comprising the step of admitting lime water having a lime concentration of less than 30% by weight into said combustion vessel to reduce sulfur dioxides.

10. The method according to claim 1 wherein said untreated combustion gas traverses said combustion vessel between a wall of said combustion vessel and said treated gas stream.

11. The method according to claim 1 wherein said reburn fuels shredded or ground biomass that is injected into said combustion gas volume being treated through a dry particle flat fan shaped outlet nozzle.

12. The method according to claim 1 wherein said reburn fuel is gas from partially gasified solid fuels.

13. The method according to claim 1 wherein said reburn fuel includes oil.

14. The method according to claim 1 wherein said reburn fuel includes coal.

15. A method according to claim 7 where additional injectors whose outlet is at the inner wall of said boiler at the same elevation as said at least one nozzle, said additional injectors producing a flat planar spray pattern resulting in a flat flame sheet perpendicular to the average combustion gas flow velocity vector or a conical flame sheet parallel to the average combustion gas flow velocity vector in the space between the boiler wall and the region of fuel rich gas, and said reburn fuel flowing at a high enough rate sufficient to convert the excess air gas stream in said wall zone to fuel rich conditions at a final temperature that rapidly converts the nitrogen oxide to nitrogen, and injecting additional air streams into said boiler downstream of said wall region and central gas region both of which have fuel rich gas to complete combustion of said fuel rich gas prior to said gas entering the convective or superheater section of the boiler.

16. The method of claim 1 wherein said reburn fuel is selected from the group consisting of pulverized coal and shredded biomass, to convert the concentration of nitrogen oxides, $NO_x$, in said effluent gas stream to nitrogen with the pneumatic injection with air or steam of said pulverized coal or shredded biomass through burners with flat elliptical outlets that produce a near flat flame perpendicular to or parallel to the bulk gas velocity direction vector and of sufficient thermal input to convert the excess air gas stream to a fuel rich stream where conversion from $NO_x$ to $N_2$ takes place.

17. The method of claim 10 adapted for use with slagging cyclone combustor fired boilers, wherein said reburn fuel is pyrolysis gas derived from crushed coal in a packed or fluidized bed and is used to convert the concentration of nitrogen oxides, $NO_x$, in said effluent gas stream to nitrogen, with heating of said coal in said bed accomplished by drawing hot combustion gases from said boiler, and with the injection of said pyrolysis gas through burners with flat elliptical outlets that produce a near flattened conical pear shaped flame pattern perpendicular to or parallel to said gas stream, depending on the furnace or boiler design and of sufficient thermal input to convert the excess air gas stream to a fuel rich stream where conversion from $NO_x$ to $N_2$ takes place, and and where the residual char from said packed or fluidized bed is fed and burned in said slagging cyclone combustors.

18. The method of claim 5 where each of said plurality of nozzles has an atomizing air chamber with outlets for droplets and inlets for liquid and air and each of said one or more nozzles are connected to a pipe that contains a pressurized aqueous liquid, said liquid containing dispersed particles, and a parallel pipe containing compressed air, where said air filled pipe and liquid filled pipe are each placed inside and co-axially within an outer water cooling flow pipe containing water flowing at sufficient rates to prevent boiling at about atmospheric pressure of all said liquids in all the pipes and inside the droplets formation nozzle, which is placed in contact with said hot gas temperatures, said outer water cooling flow pipe terminating a slight distance upstream of said compressed air and solution dispersed particle filled pipes, thereby allowing the cooling water to exit the outer cooling pipe and cool rears of said droplet formation nozzles by evaporative cooling, with the balance of the outer cooling water flow entering the furnace being treated and evaporating.

19. The method of claim 1 wherein said reburn fuel includes coal and wherein the concentration of coal particles dispersed in water or oil can be as high as 50% by weight, which requires the use of gear pumps or progressive capacity pumps to transport the liquid, but typically equal to or less than about 30%, which allows the use of lower cost centrifugal pumps to transport said liquid, and said particles are maintained in uniform dispersion in the aqueous liquid by continuous stirring of the feed tank containing the mixture and by the addition of surfactant and stabilizer chemical agents, if said solid containing liquids are stored for periods of hours or longer in said feed tanks, thereby preventing settling of the dispersed particles.

20. The method of claim 2 where said temperature is determined by means of a thermocouple with a bare exposed tip inserted into said gas stream being treated, with said thermocouple tip being recessed within a ceramic tube where said ceramic tube is held in place in a hollow metal pipe, which is connected to a vacuum source.

21. The method of claim 1 wherein said reburn fuel is pulverized coal, and further comprising the steps of drawing said pulverized coal from the outlet of coal pulverizers that also feed the coal used to fire the burners in said primary combustion zone of said combustion vessel and delivering said drawn pulverized coal to a storage bin having bottom discharges suitable for discharge through a metering rotary valve or helical screw feeder to a pneumatic conveying eductor, with said eductor connected to a pipe conveying said coal powder to a water tank, where said coal particles are dispersed and mixed with water and maintained in uniform dispersion by continuous mechanical stirring and by the addition of a chemical surfactant and stabilizer if said aqueous mixture is to be stored for hours, and conveying said mixture by means of a submersible pump to an open tank containing a continuously operating stirring device, said aqueous mixture is pumped with a submersible pump that maintains a continuous prime to a high pressure liquid pump, all said pumps being of either centrifugal or progressive cavity design, that re-circulates part of the liquid to the open tank to help maintain uniform dispersion of the solids, and feeds the balance of the aqueous mixture to said injector with said liquid and compressed air injection rates controlled by suitable flow meters, pressure gauges and valves.

22. The method of claim 5 further comprising the step of cooling injector feed pipes to said plurality of nozzles, cooling being achieved by an external, coaxial jacket pipe having flowing water, at a rate controlled by flow meters, pressure gauges and valves, and supplied by a gravity fed tank to maintain the cooling flow in,the event of a power failure.

23. A method in accordance with claim 16, further comprising the steps of drawing said pulverized coal from the outlet of coal pulverizers that also feed the coal used to fire the burners in said primary combustion zone of said combustion vessel and delivering said drawn pulverized coal to a storage bin having bottom discharges suitable for discharge through a metering rotary valve or helical screw feeder to a pneumatic conveying eductor, with said eductor connected to a pipe conveying said coal powder to the burners to convert the excess combustion gas stream to a fuel rich gas stream.

24. A method in accordance with claim 5, further comprising the step of inserting said plurality of nozzles through pre-existing ports on said boiler or furnace.

25. A method in accordance with claim 21 where said surfactant and stabilizer is mixed in said aqueous mixtures concentration that are typically less than 1% by weight.

26. A method in accordance with claim 16, further comprising the steps of blowing said shredded biomass fuel into a storage bin having a baghouse for removing the conveying air for said blown biomass material and where said bin has a bottom vibrating discharge and compressed airjets to enable said biomass to discharge through a metering rotary valve to a pneumatic conveying eductor, with said eductor having a helical screw feeder at said eductor inlet for said biomass to prevent blockage of the inlet of the eductor by the biomass, and with said eductor connected to a pipe conveying the biomass to the burners used to convert the excess combustion gas stream to a fuel rich gas stream.

27. A method in accordance with claim 1, where the primary combustion of the fuel whose combustion gas enters the zone being treated for $NO_x$ reduction, is implemented at the minimum excess air needed to effect efficient combustion of said fuel.

28. A method in accordance with claim 1 further comprising the step of injecting ammonia, urea, or combinations thereof into said combustion vessel to provide additional reduction of nitrogen oxides, said step of injection being performed in said combustion vessel in a gas zone having a temperature ranging from approximately 1800° F. to 2200° F.

29. A combustion system with a boiler wall, comprising:
a combustion vessel having a primary combustion zone, a reburn combustion zone, and a final combustion zone, said primary combustion zone accommodating a majority of a fuel input to the combustion vessel and said reburn combustion zone having the balance of the fuel input;
means for admitting a fossil fuel into said primary combustion zone, said fossil fuel being converted to a combustion gas stream having a stoichiometric ratio greater than 1 (fuel lean) in said primary combustion zone, said combustion gas stream being transported to said reburn combustion zone and said final combustion zone before exiting said combustion vessel;
means for admitting re-burn fuel into said combustion gas stream in said reburn combustion zone by using one or more injectors producing varying droplet sizes or fan shaped dry particle injectors placed a distance from the boiler wall at the edges of a combustion gas volume being treated to produce a treated combustion gas volume, said combustion gas stream having a volume and said reburn fuel being selected from the group consisting of pulverized coal, coal-water slurries, coal-oil slurries, shredded or ground biomass, heavy oil, light oil, pyrolysis gas, and gas from partially gasified solid fuels, said reburn fuel converting said combustion gas volume to a treated gas stream having a stoichiometric ratio less than 1 (fuel rich); and either a means for combining within said combustion vessel said treated gas stream with untreated combustion gas from said combustion gas stream resulting in complete combustion of said treated gas stream in said final combustion zone, or a means for injecting atmospheric air into said combustion vessel, said air supplied externally from said combustion vessel at high velocity through existing openings or added openings in said combustion vessel wall, downstream of said treated combustion gas volume in order to complete combustion of said treated gas stream in said final combustion zone, said reburn fuel is introduced into said combustion gas volume being treated within said combustion vessel by said means for admitting re-burn fuel at an initial temperature that is high enough for complete combustion but low enough to prevent the formation of thermal nitrogen oxides in said final combustion zone.

30. The combustion system of claim 29 wherein said temperature ranges prior to injection of the reburn fuel from approximately 2000° F. to 2500° F. within the combustion gas volume being treated, said gas volume being normally a distance from said combustion vessel walls, said initial gas temperature being high enough to fully oxidize the combustion gas volume treated with the reburn fuel without resulting in a temperature at or near 3000° F. where thermal nitrogen oxides are formed.

31. The combustion system of claim 29 wherein said means for combining the treated gas stream and untreated combustion gas in said combustion vessel and said means for combining utilizes gas density gradients to achieve mixing with said treated gas stream having a lower density than said untreated combustion gas.

32. The combustion system of claim 29 wherein said means for injecting air at high velocities is used in said combustion vessel and said means for injecting includes maximum use of existing openings, with added openings needed to assure complete combustion of the treated gas volume in a wall of said combustion vessel for introducing air into said combustion vessel.

33. The combustion system of claim 29 wherein said means for admitting reburn fuel includes a plurality of nozzles positioned in said combustion vessel, with the outlets of said nozzles being placed at the outer edges of the gas volume being treated, said plurality of nozzles creating a fuel rich zone in said reburn combustion zone of said combustion vessel.

34. The combustion of system of claim 33 wherein said nozzles emit droplets of non-uniform size ranging from 10 to 1000 $\mu$m in diameter.

35. The combustion system of claim 29 wherein said means for admitting reburn fuel includes at least one nozzle which emits said droplets or dry particles reburn fuel as a flat fan shaped spray.

36. The combustion system of claim 35 wherein said liquid fuel nozzle emits droplets of non-uniform size ranging from 10 to 1000 $\mu$m in diameter.

37. The combustion system of claim 29 further comprising a means for admitting lime-water at lime concentrations less than 30% by weight into said combustion vessel to reduce sulfur dioxides.

* * * * *

UNITED STATES PATENT AND TRADEMARK OFFICE
CERTIFICATE OF CORRECTION

| | |
|---|---|
| PATENT NO. | : 6,453,830 B1 |
| APPLICATION NO. | : 09/794613 |
| DATED | : September 24, 2002 |
| INVENTOR(S) | : Zauderer |

It is certified that error appears in the above-identified patent and that said Letters Patent is hereby corrected as shown below:

At column 10, line 5 of the printed patent, "ooiler" should be --boiler--.

At column 10, line 26 of the printed patent, "often" should be --of ten--.

At column 13, line 12 of the printed patent, "heat" should be --head--.

At column 13, line 40 of the printed patent, "mixture" should be --mixtures--.

At column 15, line 33 of the printed patent, "selection is issue" should be --selection issue--.

At column 18, line 54 of the printed patent, "Al" should be --All--.

At column 19, line 56 of the printed patent, "inside" should be --outside--.

At column 20, line 33 of the printed patent, "fill" should be --fuel--.

At column 21, line 7 of the printed patent, "such nickel" should be --such as nickel--.

At column 21, line 32 of the printed patent, "boiler" should be --gasifier/pyrolizer--.

At column 21, line 66 of the printed patent, "2A and" should be --2A, 2F and--.

At column 27, line 18 of the printed patent, "utility" should be --utility boilers--.

At column 28, line 58 of the printed patent, "fill" should be --full--.

At column 32, line 18 of the printed patent, "deduced from" should be --was reduced based on--.

UNITED STATES PATENT AND TRADEMARK OFFICE
CERTIFICATE OF CORRECTION

PATENT NO. : 6,453,830 B1
APPLICATION NO. : 09/794613
DATED : September 24, 2002
INVENTOR(S) : Zauderer It is certified that error appears in the above-identified patent and that said Letters Patent is hereby corrected as shown below:

At column 32, line 19 of the printed patent, "was" should be --of--.

At column 36, line 20 of the printed patent, "facility" should be --facilitate--.

At column 39, line 52 of the printed patent, "FIG. 3C" should be --FIG. 3F--.

At column 41, line 30 (claim 1, line 30) of the printed patent, "said God combustion" should be --said combustion--.

At column 41, line 36 (claim 2, line 3) of the printed patent, "prior to of" should be --prior to injection of--.

Signed and Sealed this

First Day of January, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,453,830 B1 |
| APPLICATION NO. | : 09/794613 |
| DATED | : September 24, 2002 |
| INVENTOR(S) | : Zauderer |

Page 1 of 1

It is certified that error appears in the above-identified patent and that said Letters Patent is hereby corrected as shown below:

At column 10, line 5 of the printed patent, "ooiler" should be --boiler--.

At column 10, line 26 of the printed patent, "often" should be --of ten--.

At column 18, line 54 of the printed patent, "Al" should be --All--.

At column 20, line 33 of the printed patent, "fill" should be --fuel--.

At column 28, line 58 of the printed patent, "fill" should be --full--.

At column 41, line 30 (claim 1, line 30) of the printed patent, "said God combustion" should be --said combustion--.

At column 41, line 36 (claim 2, line 3) of the printed patent, "prior to of" should be --prior to injection of--.

Signed and Sealed this

Twenty-second Day of January, 2008

JON W. DUDAS
*Director of the United States Patent and Trademark Office*